United States Patent [19]

Udagawa et al.

[11] Patent Number: 5,541,648
[45] Date of Patent: Jul. 30, 1996

[54] COLOR IMAGE PICKUP APPARATUS HAVING A PLURALITY OF COLOR FILTERS ARRANGED IN AN OFFSET SAMPLING STRUCTURE

[75] Inventors: Yoshiro Udagawa, Saitama-ken; Akihiko Shiraishi, Kawasaki; Akira Mamiya, Yokohama, all of Japan

[73] Assignee: Canon Kabushiki Kaisha, Tokyo, Japan

[21] Appl. No.: 133,214

[22] Filed: Oct. 7, 1993

[30] Foreign Application Priority Data

Oct. 9, 1992 [JP] Japan .................................. 4-297727
Oct. 16, 1992 [JP] Japan .................................. 4-304974
Dec. 28, 1992 [JP] Japan .................................. 4-360131

[51] Int. Cl.$^6$ .................................................. H04N 9/07
[52] U.S. Cl. ........................ 348/222; 348/229; 348/279
[58] Field of Search ................................... 348/237, 229, 348/231, 277, 279, 222; 358/41, 43, 44; H04N 9/04, 9/07, 9/077

[56] References Cited

U.S. PATENT DOCUMENTS

| 4,845,548 | 7/1989 | Kohno | 348/279 |
| 5,034,805 | 7/1991 | Ishizaka | 348/279 |
| 5,121,193 | 6/1992 | Nishimura | 348/279 |
| 5,249,041 | 9/1993 | Shiraishi | 348/231 |

FOREIGN PATENT DOCUMENTS 61-137486 6/1986 Japan .
63-199590 8/1988 Japan .
4332288 11/1992 Japan .

*Primary Examiner*—Safet Metjahic
*Assistant Examiner*—Sherrie Hsia
*Attorney, Agent, or Firm*—Fitzpatrick, Cella, Harper & Scinto

[57] ABSTRACT

A color image pickup apparatus includes an image pickup element, an optical low-pass filter, and a memory. The image pickup element has four types of color filters which are arranged to form an offset sampling structure in which color filters of different colors are repeatedly arranged at a two-pixel period in the horizontal direction, and color filters of different colors are repeatedly arranged at a two-pixel period in the vertical direction while being offset in the horizontal direction by one pixel. The optical low-pass filter has an optical member for splitting an incident light beam into two light beams separated from each other by a distance D in a direction inclined clockwise or counterclockwise at an angle θ with respect to a scanning direction of the image pickup element, the distance D satisfying conditions defined by $1.6 Ph Pv/\lambda Ph \sin\theta + 2Pv \cos\theta| \leq D \leq 2.4 Ph Pv/\lambda Ph \sin\theta + 2Pv \cos\theta|(0 \leq \theta \leq \pi/2)$ where Ph is the pitch of the image pickup element in the horizontal direction, and Pv is the pitch of the image pickup element in the vertical direction. The memory temporarily stores an output from the image pickup element. Necessary information is read out from the memory, and digital signal processing is performed to obtain an image.

2 Claims, 34 Drawing Sheets

FIG. 1
(PRIOR ART)

| COLUMN | 1 | 2 | 3 | 4 | 5 | 6 | | | |
|---|---|---|---|---|---|---|---|---|---|
| ROW 1 | R | R | B | B | R | R | B | ---- | B |
| 2 | G | G | G | G | G | G | G | ---- | G |
| 3 | R | R | B | B | R | R | B | ---- | B |
| 4 | G | G | G | G | G | G | G | ---- | G |
| 5 | R | R | B | B | R | R | B | ---- | B |
| 6 | G | G | G | G | G | G | G | ---- | G |
| 7 | | | | | | | | | |
| ⋮ | | | | | | | | | |
| Z−1 | | | | | | | | | |
| Z | | | | | | | | | |

EVEN ↓ ↓ ↓ ↓

ODD ↓ ↓ ↓ ↓

FIG. 2
(PRIOR ART)

|  | Cy | Ye | Cy | Ye |
|---|---|---|---|---|
| Bn-1 | Mg | Gr | Mg | Gr |
| Bn | Cy | Ye | Cy | Ye |
|  | Gr | Mg | Gr | Mg |
| Bn+1 | Cy | Ye | Cy | Ye |
|  | Mg | Gr | Mg | Gr |

| ODD/EVEN | ROW | COLUMN 1 | 2 | 3 | 4 ----- |
|---|---|---|---|---|---|
| ← (ODD) | 1 | C1 (Pv) | C2 | C1 | C2 |
| ← (EVEN) | 2 | C1 | C2 | C1 | C2 |
| ← (ODD) | 3 | C3 | C4 | C3 | C4 |
| ← (EVEN) | 4 | C3 | C4 | C3 | C4 |
| ← (ODD) | 5 | C1 | C2 | C1 | C2 |
| ← (EVEN) | 6 | C1 | C2 | C1 | C2 |

Ph (across column 1)

FIG. 6

| Cy | Ye | Cy | Ye |
|----|----|----|-----|
| Mg | Gr | Mg | Gr |
| Ye | Cy | Ye | Cy |
| Gr | Mg | Gr | Mg |
| Cy | Ye | Cy | Ye |
| Mg | Gr | Mg | Gr |

FIG. 7

| COLUMN | 1 | 2 | 3 | 4 | 5 | 6 | ............ | 764 |
|--------|---|---|---|---|---|---|---|---|
| ROW | Ph | | | | | | | |
| 1 Pv | Gr | Mg | Gr | Mg | Gr | Mg | ------------ | Mg |
| 2 | Ye | Cy | Ye | Cy | Ye | Cy | ------------ | Cy |
| 3 | Mg | Gr | Mg | Gr | Mg | Gr | ------------ | Gr |
| 4 | Cy | Ye | Cy | Ye | Cy | Ye | ------------ | Ye |
| 5 | Gr | Mg | Gr | Mg | Gr | Mg | ------------ | Mg |
| 6 | Ye | Cy | Ye | Cy | Ye | Cy | ------------ | Cy |
| 7 | Mg | Gr | Mg | Gr | Mg | Gr | ------------ | Gr |
| ⋮ | ⋮ | ⋮ | ⋮ | ⋮ | ⋮ | ⋮ | | ⋮ |
| 481 | | | | | | | | |
| 482 | Ye | Cy | Ye | Cy | Ye | Cy | ------------ | Cy |

| G | G | G | G |
|---|---|---|---|

| R | B | R | B |
|---|---|---|---|

FIG. 18
(PRIOR ART)

| Y | Y | Y | Y | Y | Y | Y |
|---|---|---|---|---|---|---|
| R | B | R | B | R | B | R |
| Y | Y | Y | Y | Y | Y | Y |
| R | B | R | B | R | B | R |
| Y | Y | Y | Y | Y | Y | Y |
| R | B | R | B | R | B | R |
| Y | Y | Y | Y | Y | Y | Y |
| R | B | R | B | R | B | R |

● ---- CARRIER OF LUMINANCE SIGNAL

⊙ ---- BASE BAND OF LUMINANCE SIGNAL

△ ---- CARRIER OF COLOR DIFFERENCE SIGNAL

▲ ---- BASE BAND OF COLOR DIFFERENCE SIGNAL

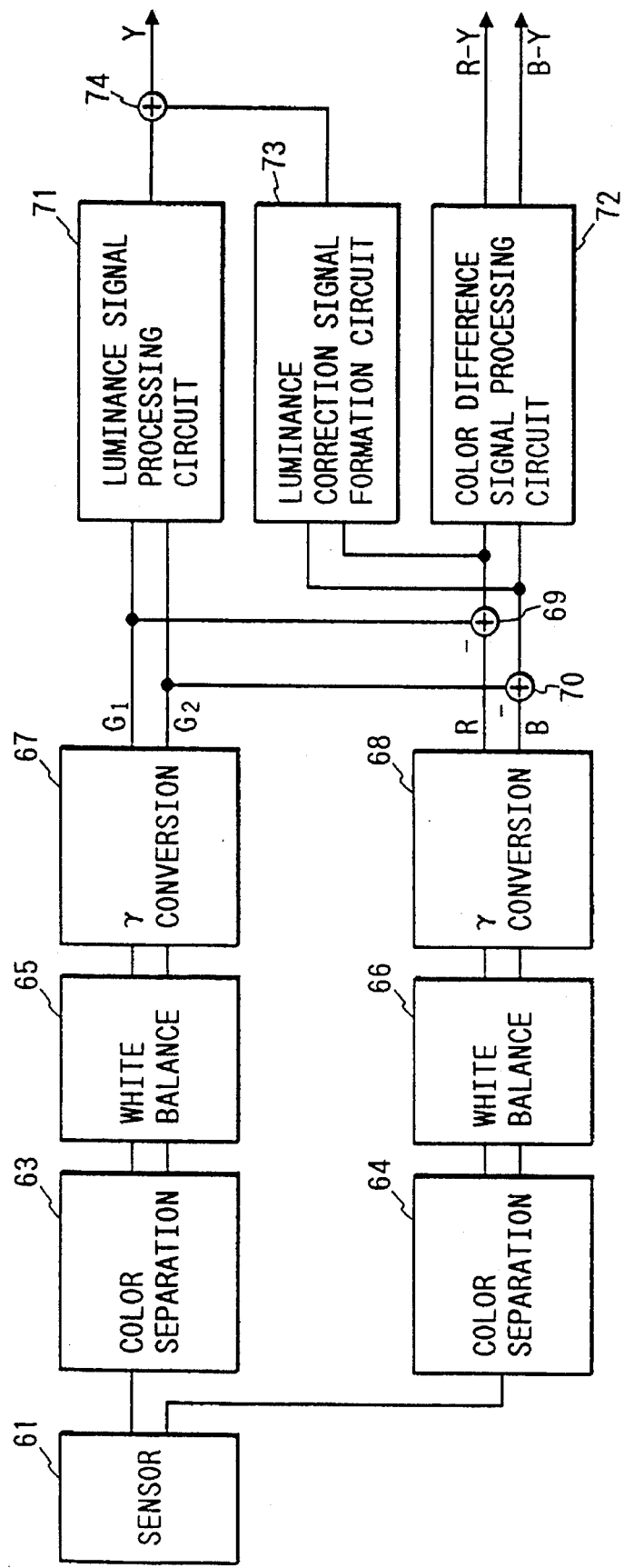

| $G_1$ | $G_2$ | $G_1$ | $G_2$ | $G_1$ | $G_2$ | $G_1$ |
|---|---|---|---|---|---|---|
| R | B | R | B | R | B | R |
| $G_1$ | $G_2$ | $G_1$ | $G_2$ | $G_1$ | $G_2$ | $G_1$ |
| R | B | R | B | R | B | R |
| $G_1$ | $G_2$ | $G_1$ | $G_2$ | $G_1$ | $G_2$ | $G_1$ |
| R | B | R | B | R | B | R |
| $G_1$ | $G_2$ | $G_1$ | $G_2$ | $G_1$ | $G_2$ | $G_1$ |
| R | B | R | B | R | B | R |

| $Y_1$ | $Y_2$ | $Y_1$ | $Y_2$ | $Y_1$ | $Y_2$ | $Y_1$ |
|---|---|---|---|---|---|---|
| R | B | R | B | R | B | R |
| $Y_1$ | $Y_2$ | $Y_1$ | $Y_2$ | $Y_1$ | $Y_2$ | $Y_1$ |
| R | B | R | B | R | B | R |
| $Y_1$ | $Y_2$ | $Y_1$ | $Y_2$ | $Y_1$ | $Y_2$ | $Y_1$ |
| R | B | R | B | R | B | R |
| $Y_1$ | $Y_2$ | $Y_1$ | $Y_2$ | $Y_1$ | $Y_2$ | $Y_1$ |
| R | B | R | B | R | B | R |

| $G_1$ | $G_2$ | $G_1$ | $G_2$ |
|---|---|---|---|

| R | B | R | B |
|---|---|---|---|

FIG. 27A
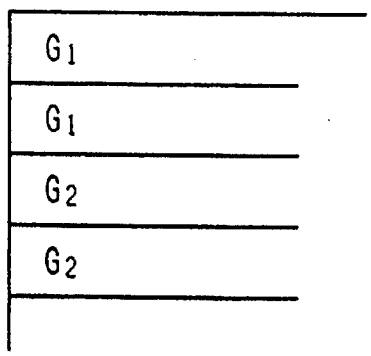
FIG. 27B
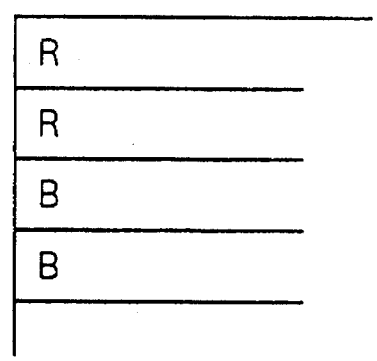
FIG. 28A
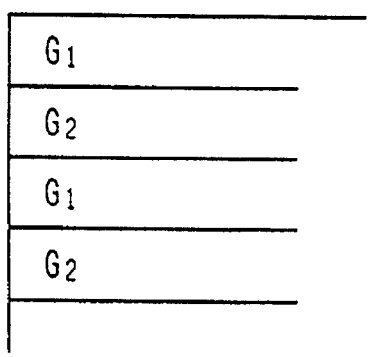
FIG. 28B
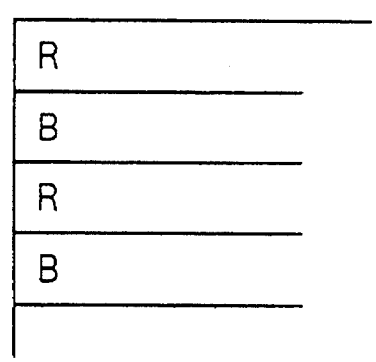
FIG. 30A
FIG. 30B

● ---- CARRIER OF LUMINANCE SIGNAL

⊙ ---- BASE BAND OF LUMINANCE SIGNAL

△ ---- CARRIER OF COLOR DIFFERENCE SIGNAL

▲ ---- BASE BAND OF COLOR DIFFERENCE SIGNAL

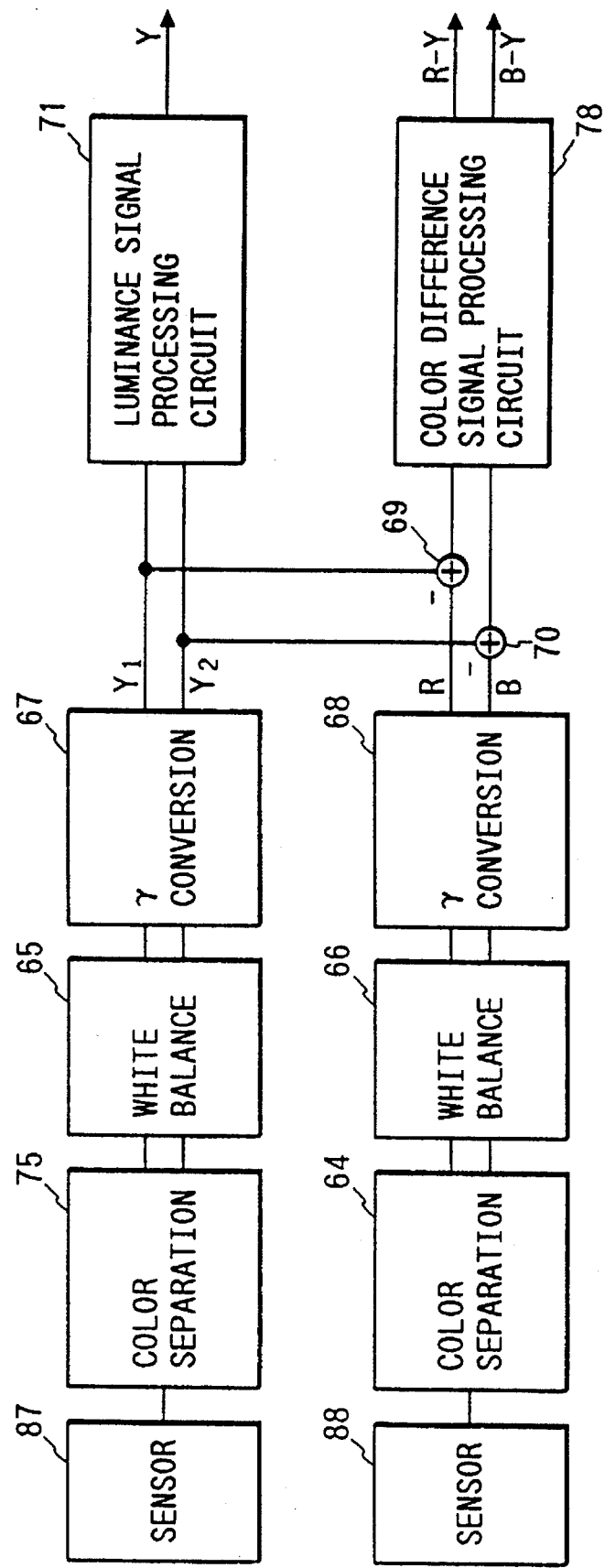

| $Y_1$ | $Y_2$ | $Y_1$ | $Y_2$ |

| R | B | R | B |

FIG. 34

| Mg | G | Mg | G | |
|----|---|----|---|---|
| Cy | Ye | Cy | Ye | |
| Mg | G | Mg | G | |
| Cy | Ye | Cy | Ye | |
| Mg | G | Mg | G | |
| Cy | Ye | Cy | Ye | |
| | | | | |

● ---- CARRIER OF LUMINANCE SIGNAL

⊙ ---- BASE BAND OF LUMINANCE SIGNAL

△ ---- CARRIER OF COLOR DIFFERENCE SIGNAL

▲ ---- BASE BAND OF COLOR DIFFERENCE SIGNAL

EVEN LINE

Cy+G → Ye+Mg    L(N+1)

Mg+Cy → G+Ye    1/2{L(N)+L(N+4)}

ODD LINE

Mg+Cy → G+Ye    L(N+3)

Cy+G → Ye+Mg    1/2{L(N+1)+L(N+5)}

S1    S2

| | →H | | | | | | | | | | | |
|---|---|---|---|---|---|---|---|---|---|---|---|---|
| ↓V | Ye | Ye | Ye | Ye | Ye | Ye | Ye | Ye | Ye | Ye | Ye | Ye |
| | G | G | G | G | G | G | G | G | G | G | G | G |
| | Cy | Cy | Cy | Cy | Cy | Cy | Cy | Cy | Cy | Cy | Cy | |
| | Ye | Ye | Ye | Ye | Ye | Ye | Ye | Ye | Ye | Ye | Ye | |
| | G | G | G | G | G | G | G | G | G | G | | |
| | Cy | Cy | Cy | Cy | Cy | Cy | Cy | Cy | Cy | | | |
| | Ye | Ye | Ye | Ye | | | | | | | | |

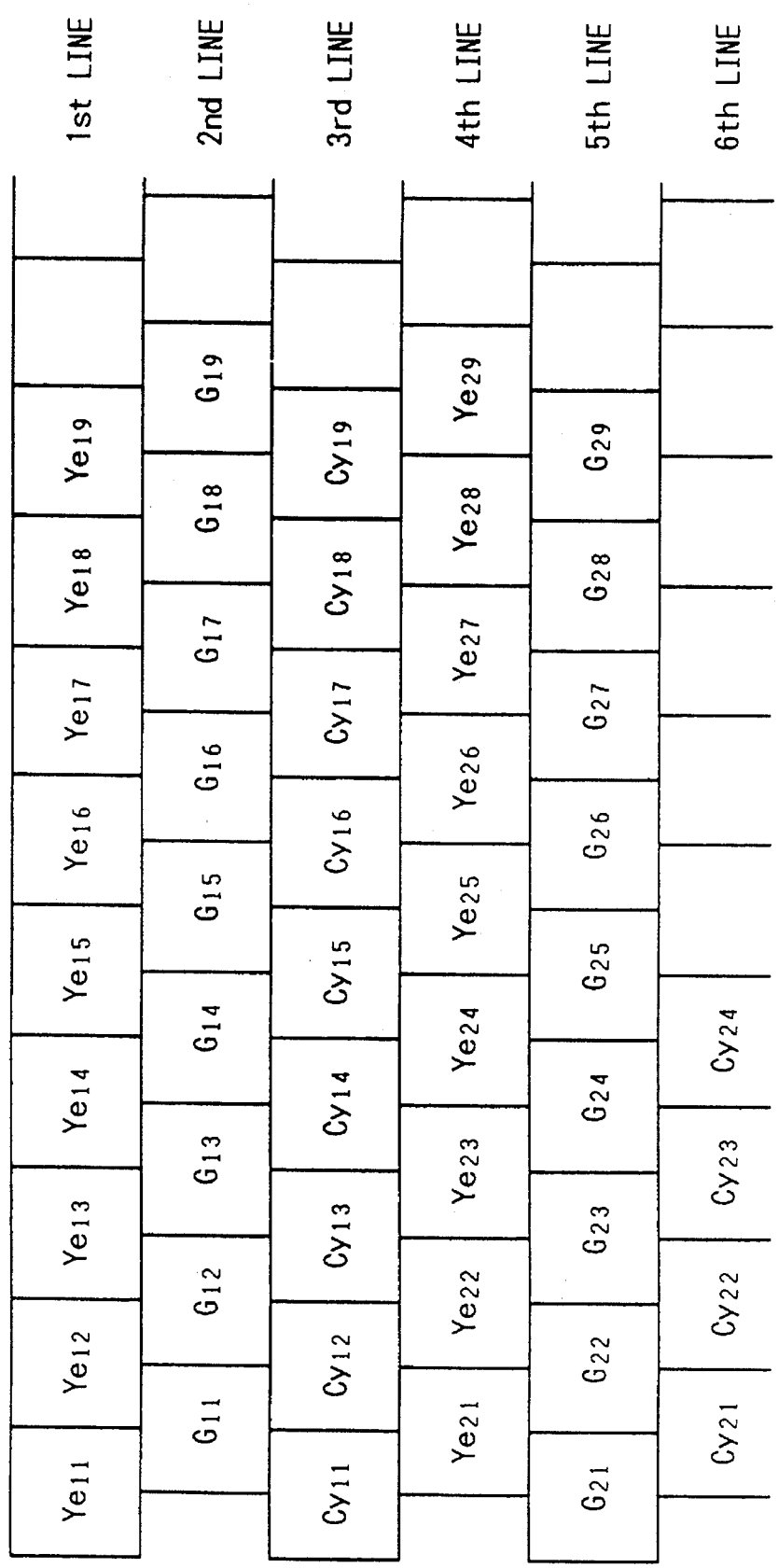

COLOR IMAGE PICKUP APPARATUS HAVING A PLURALITY OF COLOR FILTERS ARRANGED IN AN OFFSET SAMPLING STRUCTURE

BACKGROUND OF THE INVENTION

1. Field of the Invention

The present invention relates to a color image pickup apparatus having an image pickup element constituted by a plurality of two-dimensionally arranged pixels.

2. Related Background Art

With the recent advances in the semiconductor technology, digital signal processing has become a main trend in the field of video signal processing. This is because digital signal processing is more advantageous than analog signal processing in terms of the integration and definition of ICs, the easiness of various adjustments, S/N ratio, and the like.

For this reason, image pickup elements of various schemes adapted for digital signal processing have been developed because they have the advantages of small size, light weight, high reliability, and the like. Of these image pickup elements, CCD type image pickup elements having the color filter arrangements shown in FIGS. 1 and 2 are most widely used nowadays as image pickup elements for video cameras and electronic still cameras in consideration of resolution, S/N ratio, easiness of signal processing, and the like.

When frame photography of a still image is to be performed by using an electronic still camera or the like, an image pickup element having the color filter arrangement shown in FIG. 1, in which color filters of different colors are repeatedly arranged at a two-pixel period in the horizontal direction, must be used for the following reason. A pixel signal formed by the image pickup element is read out alternately from an odd field and an even field, and identical outputs must be obtained from the two fields.

Referring to FIG. 1, the image pickup element has a pitch Ph in the horizontal direction and a pitch Pv in the vertical direction.

The image pickup element shown in FIG. 2 has a color filter arrangement different from the arrangement in which color filters of different colors are repeatedly arranged at a two-pixel period in the horizontal direction.

This image pickup element has a color filter arrangement in which color filters of different colors are repeatedly arranged at a two-pixel period in the horizontal direction. This filter arrangement is constituted by lines on which magenta (Mg) and green (Gr) filters are alternately arranged, and lines on which cyan (Cy) and yellow (Ye) filters are alternately arranged. The Mg and Gr filters are arranged in the form of an offset sampling array, whereas the Cy and Ye filters are arranged in the form of a square sampling array. Note that some image pickup element has a color filter arrangement in which Mg and Gr filters are arranged in the form of a square sampling array, and Cy and Ye filters are arranged in the form of an offset sampling array.

When signals are to be read out from the image pickup element shown in FIG. 2, a method called a mixed pixel read (or a field read) method is generally used. In this method, photoelectrically converted signal charges are read out, two lines at a time, in a mixed state. According to the method, signal charges are read out in the order of $An_{n-1}$, $A_n$, $A_{n+1}$, ... in the A field, and in the order of $Bn_{n-1}$, $B_n$, $B_{n+1}$, ... in the B field.

As a result, pixel signals (Mg+Cy) and (Ye and Gr), and (Cy+Gr) and (Mg+Ye) are alternately output from the image pickup element. For the sake of convenience, these four signals are respectively represented by $C_1=Mg+Cy$ $C_2=Ye+Gr$ $C_3=Cy+Gr$ $C_4=Mg+Ye$ In this case, when these four signals are obtained, a group of spatial barycenter positions can be considered as the sampling structure shown in FIG. 3, which is based on the signals $C_1$, $C_2$, $C_3$, and $C_4$. Therefore, in the mixed pixel read mode, the image pickup elements shown in FIGS. 29A and 29B are equivalent to an image pickup element having a color filter arrangement in which color filters of different colors are repeatedly arranged at a two-pixel period in the horizontal direction. A color image is obtained by forming a luminance signal and a color signal for each field on the basis of these pixel signals.

However, when the image pickup elements having the color filter arrangements shown in FIGS. 1 and 3 are to be used, in order to extract luminance and color signals, alternate line data (e.g., first and third line data in an odd field, and second and fourth line data in an even field) must be used.

With this arrangement, since data at two points spatially separated from each other in the vertical direction are added together, the correlation in the vertical direction deteriorates. As a result, the resolution in the vertical direction decreases, and the generation amount of pseudo color (color moiré) increases.

Especially when photography of a still image is to be performed by using an electronic still camera, since only an image of one field can be obtained by the mixed pixel read method, a high-resolution image, i.e., a high-resolution frame image, cannot be obtained.

In general, the generation of this color moiré can be suppressed by an optical low-pass filter placed in front of the image pickup element. On the other hand, the use of this optical low-pass filter leads to a decrease in the resolution in the horizontal direction. For this reason, in a conventional video camera, an optical low-pass filter must be designed to determine image quality in consideration of the trade-off between the resolution and the color moiré caused by color carriers.

Recently, in order to improve image quality, a two-plate scheme color image pickup apparatus using two image pickup elements and a single plate scheme color image pickup apparatus using an image pickup element designed to ensure image quality as high as that of the two-plate scheme color image pickup apparatus have been used. Even these color image pickup apparatuses are not free from the above-described problems, i.e., the occurrence of color moiré and the inability to obtain sufficient resolution.

SUMMARY OF THE INVENTION

The present invention has been made in consideration of the above situation, and has as its object to provide a color image pickup apparatus which has high resolution and a small amount of color moiré, and which can photograph a still frame image.

According to an embodiment of the present invention, there is provided a color image pickup apparatus comprising an image pickup element having four types of color filters which are arranged to form an offset sampling structure in which color filters of different colors are repeatedly arranged at a two-pixel period in a horizontal direction, and color filters of different colors are repeatedly arranged at a two-pixel period in a vertical direction while being offset in the horizontal direction by one pixel, an optical low-pass filter having an optical member for splitting an incident light beam into two light beams separated from each other by a distance D in a direction inclined clockwise or counterclockwise at an angle θ with respect to a scanning direction of the image pickup element, the distance D satisfying conditions defined by $$1.6PhPv/|Ph \sin \theta + 2Pv \cos \theta| \leq D \leq 2.4PhPv/|Ph \sin \theta + 2Pv \cos \theta|(0 \leq \theta \leq \pi/2)$$

where Ph is a pitch of the image pickup element in the horizontal direction, and Pv is a pitch of the image pickup element in the vertical direction, and a memory for temporarily storing an output from the image pickup element, wherein necessary information is read out from the memory, and digital signal processing is performed to obtain an image.

According to another embodiment of the present invention, the apparatus further comprises gain adjustment means for adjusting a gain of an output from the image pickup element to make outputs from the four types of color filters constant with respect to an achromatic object, and signal formation means for forming R, G, and B signals from the outputs from the four types of color filters by performing a matrix operation using a 3×4 matrix designed such that a sum of coefficients of two arbitrary columns in every row is equal to a sum of coefficients of remaining two columns.

According to still another embodiment of the present invention, there is provided a color image pickup apparatus comprising:

an image pickup element having four types of color filters which are arranged to form an offset sampling structure in which color filters of different colors are repeatedly arranged at a two-pixel period in a horizontal direction, and color filters of different colors are repeatedly arranged at a two-pixel period in a vertical direction while being offset in the horizontal direction by one pixel, and signal formation means for forming R, G, and B signals from the outputs from the four types of color filters by performing a matrix operation using a 3×4 matrix designed such that a sum of coefficients of two arbitrary columns in every row is equal to a sum of coefficients of remaining two columns.

According to still another embodiment of the present invention, there is provided a color image pickup apparatus comprising an image pickup element having a plurality of pixels two-dimensionally arranged in horizontal and vertical directions, wherein horizontal lines twice as many as the number of horizontal lines required to obtain a desired image are arranged in the image pickup element, the horizontal lines are first and second horizontal lines which are alternately arranged such that first color filters are arranged on each first horizontal line and second and third color filters are arranged for every other pixels on each second horizontal line, a first difference signal is formed by calculating a difference between a signal output from a given pixel for which the second color filter is arranged and a signal output from a pixel which is on the same column as that of the given pixel and for which the first color filter is arranged, a second difference signal is formed by calculating a difference between a signal output from a given pixel for which the third color filter is arranged and a signal from a pixel which is on the same column as that of the given pixel and for which the first color filter is arranged, and color difference signals are formed on the basis of the first and second difference signals.

According to still another embodiment of the present invention, there is provided a color image pickup apparatus comprising a first image pickup element having first color filters arranged therein, and a second image pickup element having second and third color filters arranged therein, the first and second image pickup elements being used to obtain a desired image, wherein a first difference signal is formed by calculating a difference between a signal output from a given pixel, in the second image pickup element, for which the second color filter is arranged and a signal output from a pixel, in the first image pickup element, which is located at a position equivalent to that of the given pixel on an imaging plane, and for which the first color filter is arranged, a second difference signal is formed by calculating a difference between a signal output from a given pixel, in the second image pickup element, for which the third color filter is arranged and a signal output from a pixel, in the first image pickup element, which is located at a position equivalent to that of the given pixel on an imaging plane, and for which the first color filter is arranged, and color difference signals are formed on the basis of the first and second difference signals.

In this case, a luminance signal is formed by synthesizing a signal output from a pixel for which the first color filter is arranged and the first and second difference signals.

Alternatively, a luminance signal may be formed on the basis of a signal output from a pixel for which the first color filter for a luminance signal is arranged.

According to the above-described embodiments, four types of color filters are arranged in an image pickup element to form an offset sampling structure in which the color filters are repeatedly arranged at 2Ph in the horizontal direction, and the color filters are repeatedly arranged at 2v in the vertical direction while being offset by Ph in the horizontal direction. With this arrangement, the color carriers generated in the horizontal and vertical directions can be reduced, and hence color moiré caused by the color carriers in the vertical and horizontal directions can be reduced, thereby increasing the resolution to the resolution limit.

In addition, satisfactory MTF characteristics can be obtained in a region lower than the resolution limit, because an optical low-pass filter is constituted by an optical member for splitting an incident light beam into two light beams separated from each other by a distance D satisfying predetermined conditions in a direction inclined clockwise or counterclockwise at an angle θ with respect to the scanning direction of the image pickup element. Therefore, the resolution can be increased to the resolution limit. In addition, since frequency components at frequencies higher than the frequency of the resolution limit are sufficiently suppressed, color moiré caused by aliasing distortion of color carriers can be reduced.

The gain of an output from the image pickup element is adjusted to make outputs from the four types of color filters constant. In addition, a matrix operation to be performed when the R, G, and B signals are obtained from these outputs is performed by using a 3×4 matrix which is designed such that the sum of the coefficients of two arbitrary columns of every row is equal to the sum of the coefficients of the remaining two columns. With this operation, the color carriers generated in the vertical direction can be further reduced, and hence color moiré in the vertical direction can be further reduced.

If the color image pickup apparatus of the present invention is a multiple-plate scheme color image pickup apparatus using a plurality of image pickup elements or a single-plate scheme color image pickup apparatus using an image pickup element having horizontal lines twice as many as those of a general image pickup element, first to third color filters of different colors are arranged for the respective pixels. With this arrangement, two types of difference signals are formed by calculating the differences between signals obtained from given pixels for which the second and third color filters are respectively arranged, and signals obtained from pixels which are at positions equivalent to those of the given pixels on the imaging plane and for which the first color filters are arranged. Color difference signals are obtained on the basis of these difference signals. Therefore, the color carriers generated in the horizontal and vertical directions can be reduced, thus reducing color moiré in the horizontal and vertical directions and increasing the resolution to the resolution limit.

In this case, the aforementioned two types of difference signals are synthesized with a signal obtained from a pixel for which the first color filter is arranged. Correction processing is performed in this manner to obtain a proper luminance signal matching visual sensitivity. In addition, as the first color filter, a color filter having spectral characteristics matching visual sensitivity may be used. If a luminance signal is formed on the basis of a signal obtained from a pixel for which this first color filter is arranged, the processing can be simplified.

The above and other objects, features, and advantages of the present invention will be apparent from the following detailed description in conjunction with the accompanying drawings and the appended claims.

BRIEF DESCRIPTION OF THE DRAWINGS

FIG. 1 is a chart showing the filter arrangement of an image pickup element used for a conventional color image pickup apparatus;

FIG. 2 is a chart showing the filter arrangement of an image pickup element used for a conventional color image pickup apparatus;

FIG. 3 is a chart showing a sampling structure used when a mixed pixel read operation is performed in the image pickup element shown in FIG. 2;

FIG. 6 is a chart showing the filter arrangement of an image pickup element used for the first and second embodiments;

FIG. 7 is a chart showing the filter arrangement of an image pickup element used for the first and second embodiments;

FIGS. 17A and 17B are charts showing the filter arrangements of image pickup elements used for the conventional two-plate scheme color image pickup apparatus;

FIG. 18 is a chart showing the filter arrangement of an image pickup element used for a single-plate scheme color image pickup apparatus designed to obtain image quality equivalent to that obtained by the conventional two-plate scheme color image pickup apparatus;

FIG. 20 is a block diagram showing a color image pickup apparatus according to the fourth embodiment of the present invention;

FIG. 21 is a chart showing the filter arrangement of an image pickup element used for the fourth embodiment;

FIG. 23 is a chart showing the filter arrangement of an image pickup element used for the fifth embodiment;

FIGS. 25A and 25B are charts showing the filter arrangements of image pickup elements used for the sixth embodiment;

FIGS. 27A and 27B are charts showing the filter arrangements of image pickup elements used for the seventh embodiment;

FIGS. 28A and 28B are charts showing the filter arrangements of image pickup elements used for the seventh embodiment;

FIGS. 30A and 30B are charts showing the filter arrangements of image pickup elements used for the seventh embodiment;

FIG. 32 is a block diagram showing a color image pickup apparatus according to the eighth embodiment of the present invention;

FIGS. 33A and 33B are charts showing the filter arrangements of image pickup elements used for the eighth embodiment;

FIG. 34 is a chart showing still another embodiment of the color filter array of the image pickup element according to the present invention;

FIG. 48 is a chart for explaining a method of forming luminance signals; and

DETAILED DESCRIPTION OF THE PREFERRED EMBODIMENTS

The preferred embodiments of the present invention will be described below with reference to the accompanying drawings.

Figure 4:
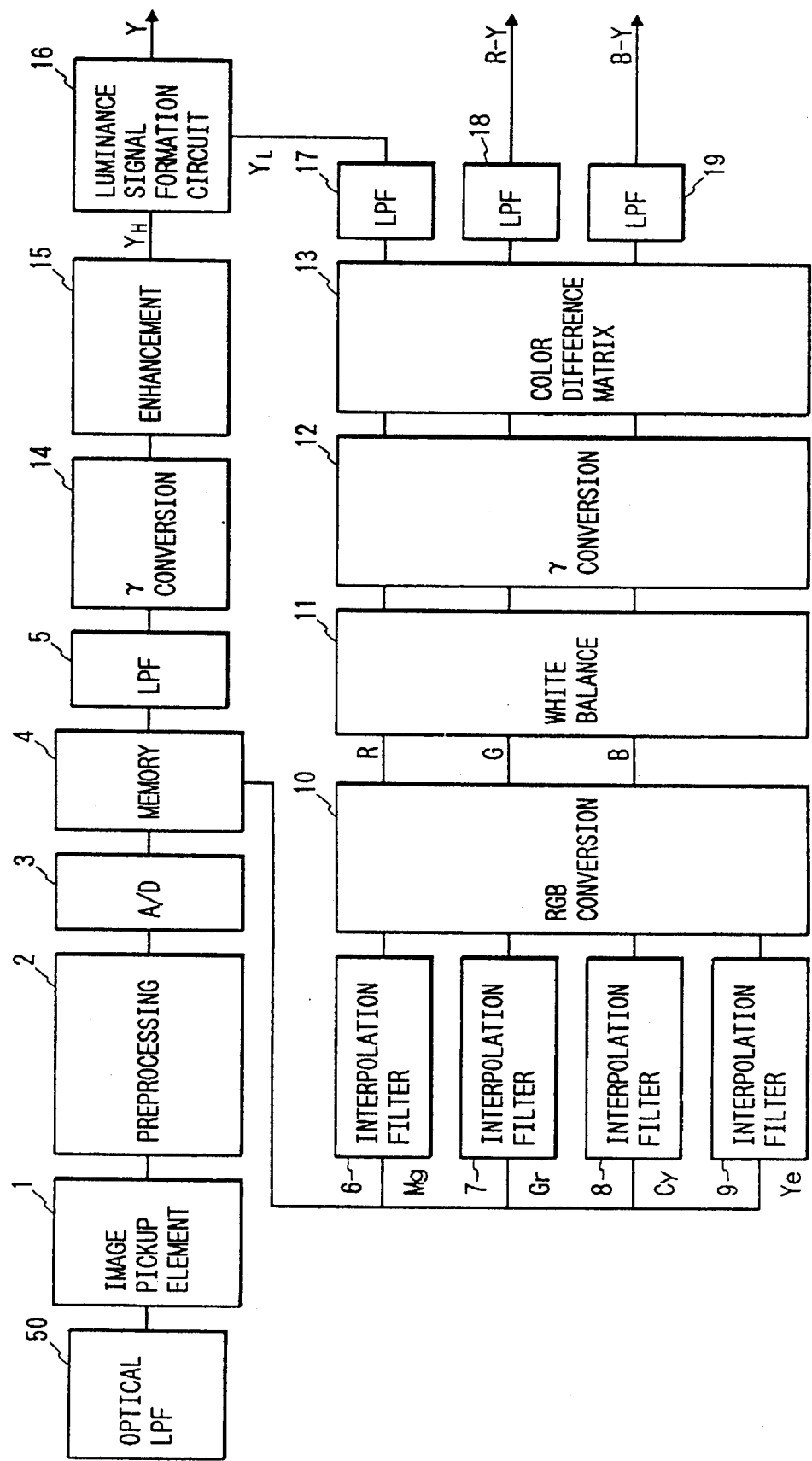
FIG. 4 is a block diagram showing a color image pickup apparatus according to the first embodiment of the present invention.

FIG. 4 is a block diagram showing a color image pickup apparatus according to the first embodiment of the present invention. Referring to FIG. 4, an image pickup element 1 serves to convert light from an optical low-pass filter 50 (to be described later) into an electrical signal. Four types of color filters (to be described later) are arranged in the image pickup element 1.

An imaging signal is read out from the image pickup element 1 for each pixel. Each imaging signal read out from the image pickup element 1 is subjected to CDS processing (removal of reset noise or clock noise from each output signal from the image pickup element 1), AGC processing (optimization of the input signal level), and the like in a preprocessing circuit 2. Thereafter, the signal is A/D-converted by an A/D converter 3 at a timing synchronized with a read clock. The A/D converter 3 preferably has linear characteristics in consideration of subsequent color processing, and preferably has the ability to perform A/D conversion with a precision of 8 bits or more in consideration of quantization errors.

The A/D-converted signal is temporarily written in a buffer memory 4 for two-dimensional signal processing to be performed later. Signals required for the processing are read out from this buffer memory 4.

Signals corresponding to luminance signals are sequentially read out from the buffer memory 4 in the order corresponding to the pixel array of the image pickup element 1 so as to be input to a low-pass filter 5. The signals input to the low-pass filter 5 undergo a predetermined band limiting process. The resultant signals are subjected to predetermined processes in a γ conversion section 14 and an enhancer 15 to become a luminance signal $Y_H$ containing a high-frequency component. Note that the luminance signal $Y_H$ containing the high-frequency component may be obtained by using a high-pass filter (HPF) 21 as in the second embodiment shown in FIG. 5.

The luminance signal $Y_H$ including the high-frequency component, obtained in this manner, is synthesized with a low-frequency component $Y_L$ (of a luminance signal), obtained by a method to be described later, by a luminance signal formation circuit 16. The resultant signal is then output as a luminance signal Y.

Meanwhile, signals corresponding to color signals Mg, Gr, Cy, and Ye are read out from the buffer memory 4 in the same manner as described above and are converted into synchronized color signals Mg, Gr, Cy, and Ye through four interpolation filters 6, 7, 8, and 9. Subsequently, these four types of color signals are input to an RGB conversion section 10 to be converted into three primary color signals R, G, and B. Note that this conversion is performed by the following matrix operation:

$$\begin{bmatrix} R \\ G \\ B \end{bmatrix} = A \begin{bmatrix} Mg \\ Gr \\ Cy \\ Ye \end{bmatrix} \quad (2)$$

In this case, the matrix A is a 3×4 matrix which is optimized to allow spectral characteristics Mg(λ), Gr(λ), Cy(λ), and Ye(λ) of the signals Mg, Gr, Cy, and Ye from the image pickup element 1 to approximate ideal spectral characteristics R(λ), G(λ), and B(λ), of the signals R, G, and B, defined by the NTSC standards.

Figure 5:
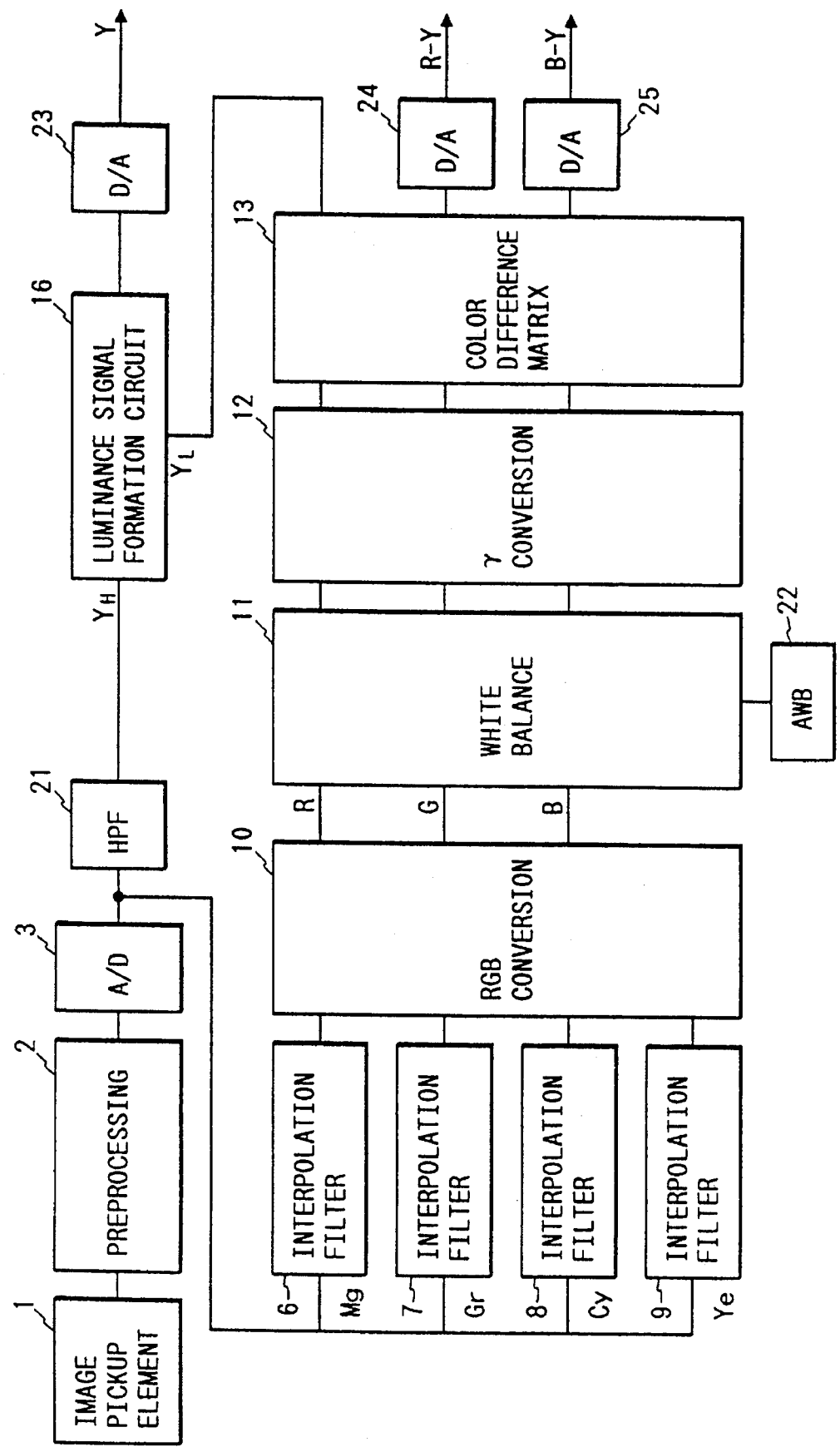
FIG. 5 is a block diagram showing a color image pickup apparatus according to the second embodiment of the present invention.

The three signals R, G, and B formed by the RGB conversion section 10 are converted into signals αR, G, and βB by a white balance section 11, thus achieving a white balance. This white balance adjustment may be automatically performed on the basis of color temperature data obtained by using a white balance sensor 22, as shown in FIG. 5.

Subsequently, the R, G, and B signals are γ-converted by table conversion in a γ conversion section 12 and are input to a color difference matrix section 13. In the color difference matrix section 13, the following color difference conversion conforming to the NTSC standards is performed to generate the aforementioned low-frequency component $Y_L$ and two color difference signals R−Y and B−Y:

$$\begin{bmatrix} Y \\ R-Y \\ B-Y \end{bmatrix} = \begin{bmatrix} 0.30 & 0.59 & 0.11 \\ 0.70 & -0.59 & -0.11 \\ -0.30 & -0.59 & 0.89 \end{bmatrix} \begin{bmatrix} R^\gamma \\ G^\gamma \\ B^\gamma \end{bmatrix} \quad (3)$$

The color difference signals R−Y and B−Y are subjected to a predetermined band limiting process in low-pass filters 18 and 19, respectively. The resultant signals are then output. The low-frequency component $Y_L$ is subjected to a predetermined band limiting process in a low-pass filter 17. The low-frequency component is then synthesized with the luminance signal $Y_H$ containing the high-frequency component by the luminance signal formation circuit 16, as described above, and the resultant signal is output as the luminance signal Y. Each of these signals is converted into an analog signal by a D/A converter (not shown).

This synthesizing operation performed by the luminance signal formation circuit 16 is based on the following conversion formula:

$$Y=Y_H-\delta(LPF17)*Y_H+\delta Y_L (0\leq\delta\leq1) \quad (4)$$

where (LPF17) indicates a low-pass filter having the same band as that of the low-pass filter 17, and (LPF17)*$Y_H$ indicates that the same band limiting process as that performed by the low-pass filter 17 is performed with respect to the luminance signal $Y_H$ containing the high-frequency component.

Such conversion is performed for the following reasons. In general, the low-frequency component $Y_L$ has proper luminance in terms of spectral characteristics but is not necessarily sufficiently high in S/N ratio. In contrast to this, the luminance signal $Y_H$ is sufficiently high in S/N ratio but does not necessarily have proper luminance in terms of spectral characteristics.

If the S/N ratio of the low-frequency component $Y_L$ is sufficiently high, the δ value may be fixed to "1". In this case, the processing performed by the luminance signal formation circuit 16 is equivalent to replacing a portion, of the luminance signal $Y_H$, having the same band as that of the low-frequency component $Y_L$ with the low-frequency component $Y_L$.

If the spectral characteristics of the luminance signal $Y_H$ containing the high-frequency component are sufficiently close to the proper luminance characteristics, the δ value may be fixed to "0". In this case, no processing is performed by the luminance signal formation circuit 16, and the luminance signal $Y_H$ containing the high-frequency component is directly output as the luminance signal Y.

Note that the δ value may be changed in accordance with the brightness and color information of an object to be photographed, considering the S/N ratio and color reproduction characteristics.

FIGS. 6 and 7 are charts, each showing an embodiment of a color filter array arranged in the image pickup element 1 described above. Each color filter array is constituted by four color filters, i.e., Mg, Gr, Cy, and Ye filters. In each array, color filters of different colors are repeatedly arranged at 2Ph in the horizontal direction, and color filters of different colors are repeatedly arranged at 2Pv in the vertical direction while they are offset in the horizontal direction by Ph, thereby constituting an offset sampling structure.

Note that the color filter arrays shown in FIGS. 6 and 7 need not be used as they are. For example, Mg and Cy filters or Gr and Ye filters may be interchanged. In addition, filter colors are not limited to the aforementioned four colors. For example, one of the aforementioned four colors may be arbitrary selected, and red Rd, blue B1, white Wh, and the selected color may be combined to form a color filter array.

Figure 8:
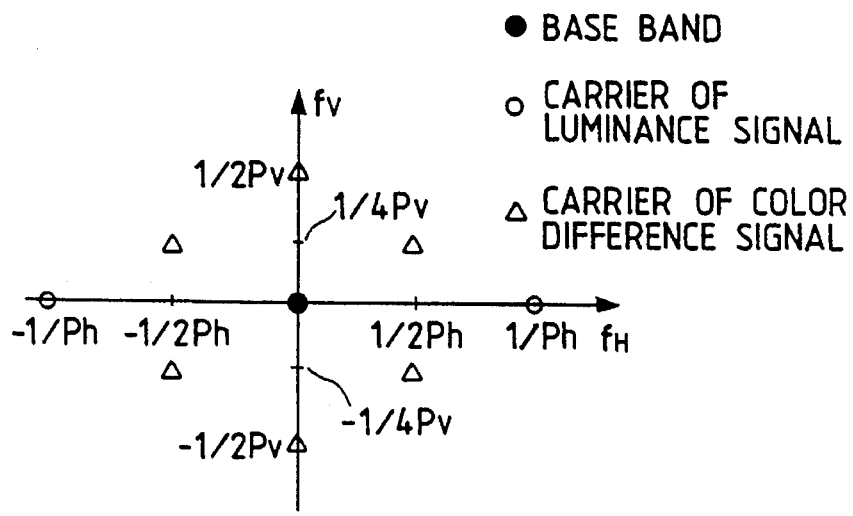
FIG. 8 is a graph showing the frequency characteristics of the image pickup element used in the first and second embodiments.

FIG. 8 is a graph showing the frequency characteristics of the image pickup element 1 having such a color filter arrangement, more specifically, a graph showing the positions where carrier components are generated near the base band.

According to this graph, luminance carriers are generated at the positions of frequencies (±1/Ph, 0) in the horizontal direction, and color carriers are generated at the positions of frequencies (±½Ph, ±¼Pv) and (0, ±½Pv).

Figure 9:
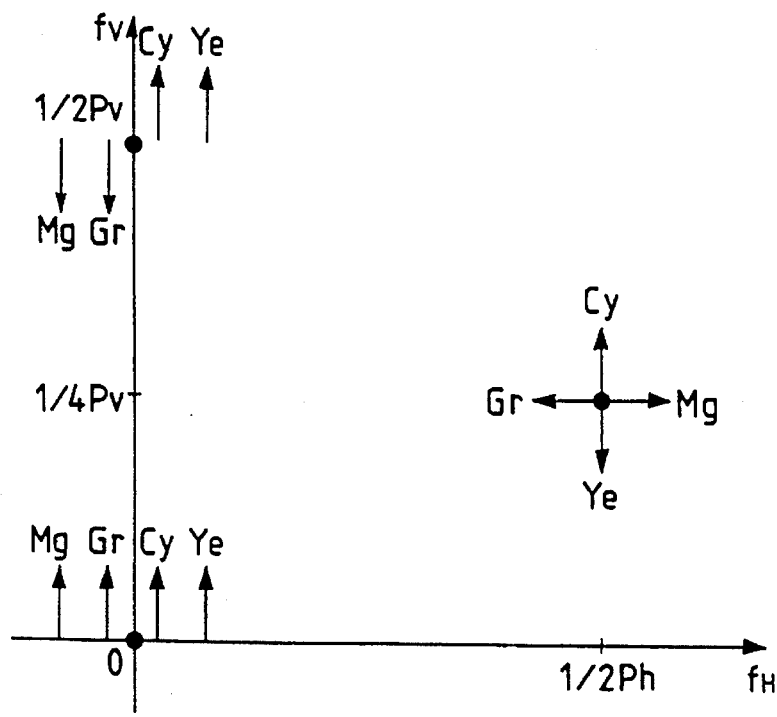
FIG. 9 is a graph showing the frequency characteristics of the image pickup element used in the first and second embodiments.
Figure 10:
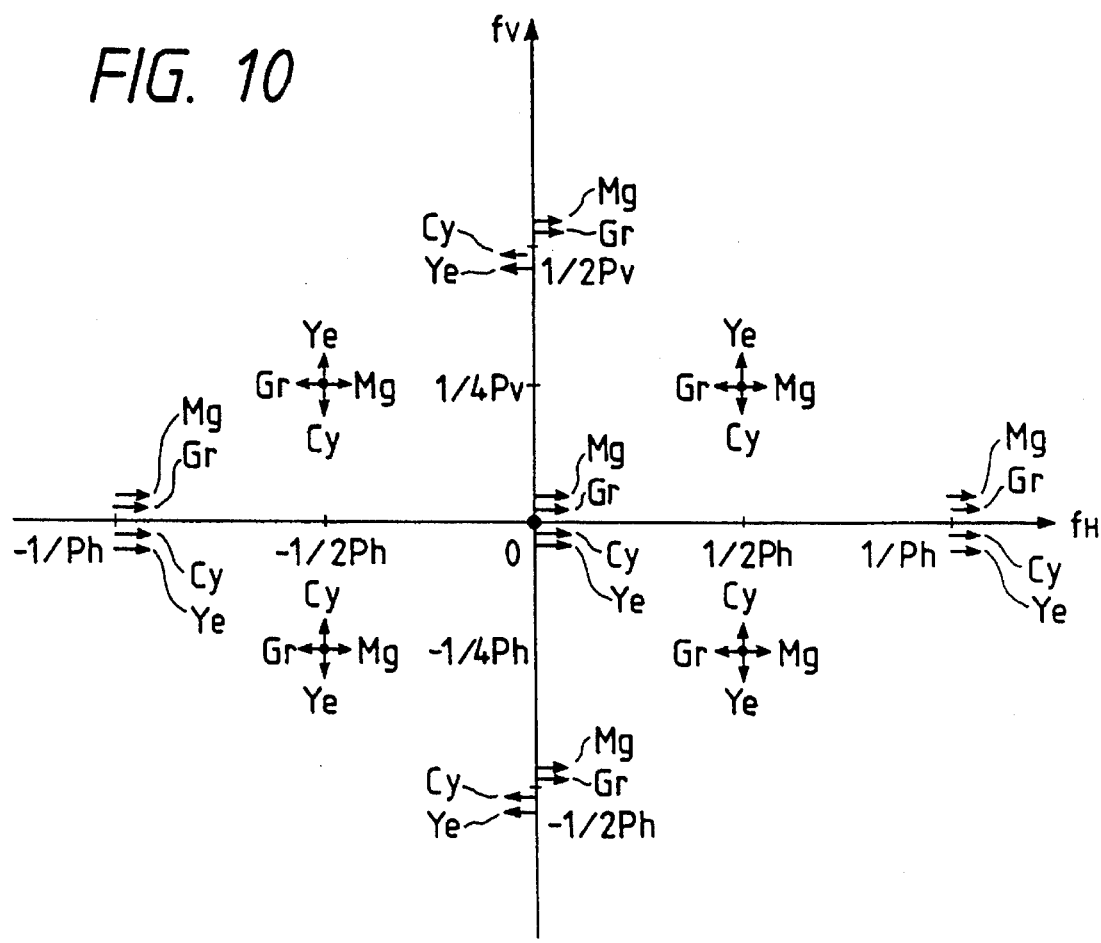
FIG. 10 is a graph showing the frequency characteristics of the image pickup element used in the first and second embodiments.

FIGS. 9 and 10 show the frequency characteristics in more detail. FIGS. 9 and 10 are graphs respectively showing the frequency characteristics of the image pickup element 1 having the color filter arrangements shown in FIGS. 6 and 7.

According to these frequency characteristics, color carriers are generated at neither the position of a frequency (0, ¼Pv) in the vertical direction nor the position of a frequency (½Ph, 0) in the horizontal direction. For this reason, the occurrence of color moiré due to aliasing from these color carriers is suppressed. Furthermore, since no carrier is generated at the position of a frequency (½Ph, 0), the resolution can be improved to $f_H$=½Ph as a theoretical resolution limit.

Figure 11:
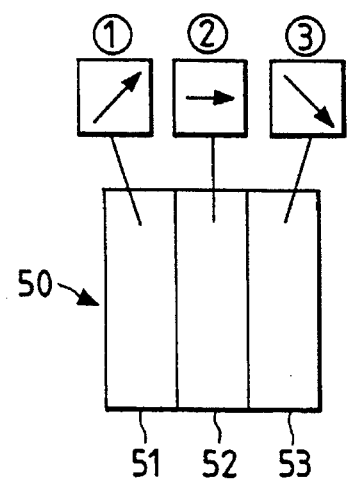
FIG. 11 is a view showing the arrangement of an optical low-pass filter according to the present invention.
Figure 12:
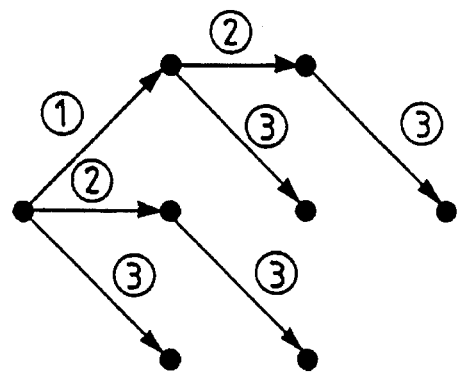
FIG. 12 is a chart showing optical paths formed by the optical low-pass filter according to the present invention.

FIG. 11 shows the schematic arrangement of the optical low-pass filter 50 described above. Referring to FIG. 11, the optical low-pass filter 50 comprises a first optical member constituted by a birefringent plate 51 for splitting an incident light beam into two light beams separated from each other by a first distance $d_1$ in a direction inclined at 45° with respect to the horizontal direction, a second optical member constituted by a birefringent plate 52 for splitting an incident light beam into two light beams separated from each other by a second distance $d_2$ in the horizontal direction, and a third optical member constituted by a birefringent plate 53 for splitting an incident light beam into two light beams separated from each other by the first distance $d_1$ in a direction inclined at −45° with respect to the horizontal direction. With the effects of the birefringent plates 51 to 53, an incident light beam propagates along the paths shown in FIG. 12.

The optical low-pass filter 50 is designed such that the first distance $d_1$ satisfies the conditions indicated by the following relation:

$$1.6PhPv/|Ph \sin\theta+2Pv\cos\theta|\leq d_1 \leq 2.4PhPv/|Ph\sin\theta+2Pv\cos\theta| (0\leq\theta\leq\pi/2) \quad (5)$$

If the first distance $d_1$ is below the lower limit indicated by relation (5), aliasing distortion due to color carriers, especially the occurrence of color moiré, cannot be suppressed. In contrast to this, if the first distance $d_1$ exceeds the upper limit, sufficiently high resolution cannot be obtained. Therefore, in order to prevent color moiré and obtain sufficiently high resolution, the first distance $d_1$ must satisfy relation (5).

The transfer characteristics (MTF characteristics) of the optical low-pass filter 50 can be expressed by the following equation:

$$H_2(f_H, f_V)=|\cos(\pi d_2 f_H)\cdot\cos(\pi/\sqrt{2}\cdot d_1(f_H+f_V))\cdot\cos(\pi/\sqrt{2}\cdot d_1(f_H-f_V))| \quad (6)$$

Consider, for example, an image pickup element used for an apparatus based on the NTSC scheme and having a display screen with an aspect ratio of 3:4, in which element, the number of effective pixels is about 640 (in the horizontal direction)×about 480 (in the vertical direction). In such an image pickup, the following equation can almost be satisfied:

$$Ph=Pv \quad (7)$$

In this embodiment, therefore, the first distance $d_1$ and the second distance $d_2$ are defined as follows:

$$d_1=2\sqrt{2}/3\cdot Ph, \quad d_2=Ph/2 \quad (8)$$

Figure 13:
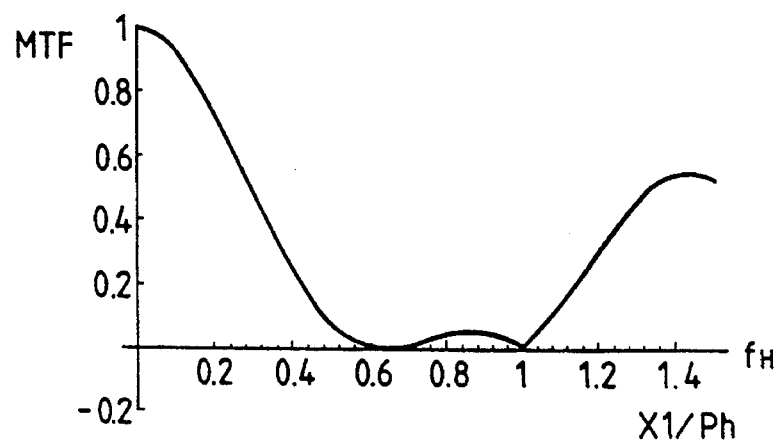
FIG. 13 is a graph showing the MTF characteristics of the optical low-pass filter according to the present invention.
Figure 14:
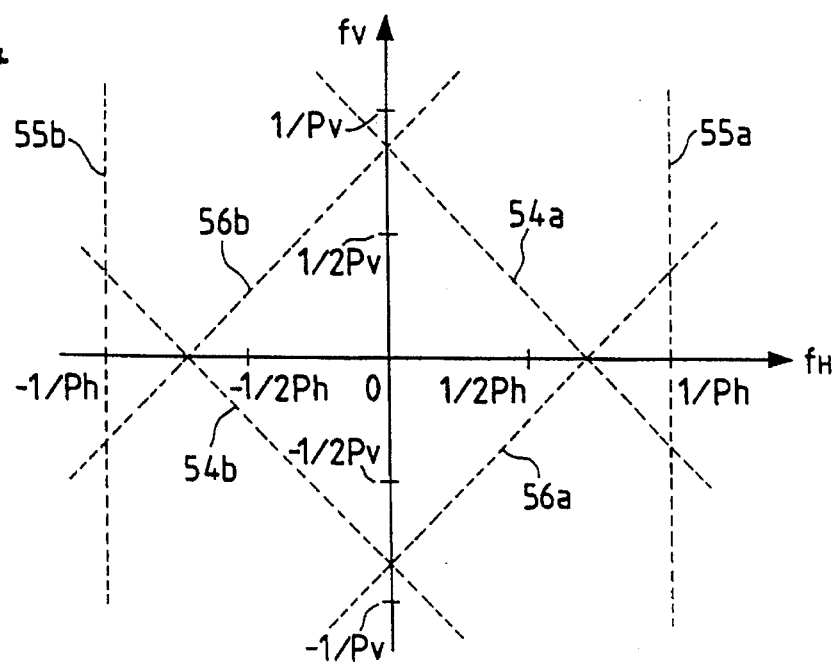
FIG. 14 is a graph showing the frequency characteristics of the optical low-pass filter according to the present invention.

FIG. 13 shows MTF characteristics which can satisfy the conditions defined by equations (8). In addition, FIG. 14 shows characteristics on a spatial frequency plane ($f_H$, $f_V$). Referring to FIG. 14, broken lines 54a, 54b, 55a, 55b, 56a, and 56b represent resonance frequencies which the optical low-pass filter 50 trap. It is apparent from this graph that the optical low-pass filter 50 traps all the carrier frequencies for both luminance and color difference signals.

As is apparent from FIG. 13, since frequency components having frequencies higher than the resolution limit frequency $f_H = \frac{1}{2}Ph$ are satisfactorily suppressed, no aliasing distortion of luminance occurs. Therefore, color moiré can be reduced. In addition, as is apparent from equations (6), (7), and (8) and FIG. 13, since the MTF does not decrease below −15 dB in the frequency region of $f_H \leq \frac{1}{2}Ph$, resolution almost equivalent to the resolution limit frequency $f_H = \frac{1}{2}Ph$ can be ensured.

In an image pickup element widely used nowadays, in which the sampling frequency for a luminance signal is four times as high as a carrier frequency $f_{SC}$ for a color difference signal, the following equation can be substantially established:

$$Ph = 1.2Pv \tag{9}$$

In this case, if the first and second distances $d_1$ and $d_2$ are defined as follows:

$$d_1 = Ph, \; d_2 = Ph/2 \tag{10}$$

the same effects as those described above can be obtained.

As described above, according to this embodiment, resolution as high as the resolution limit can be attained owing to the characteristics of the optical low-pass filter 50, while color moiré can be satisfactorily suppressed owing to the effect of the color filter array of the image pickup element 1 and the characteristics of the optical low-pass filter 50. That is, the optical low-pass filter 50 need not be designed in consideration of the trade-off between resolution and color moiré but can be designed with priority being given to resolution. Therefore, the optical low-pass filter 50 can be made low in profile and compact, and hence the overall image pickup optical system can be made compact.

The third embodiment will be described below with reference to FIG. 15.

Figure 15:
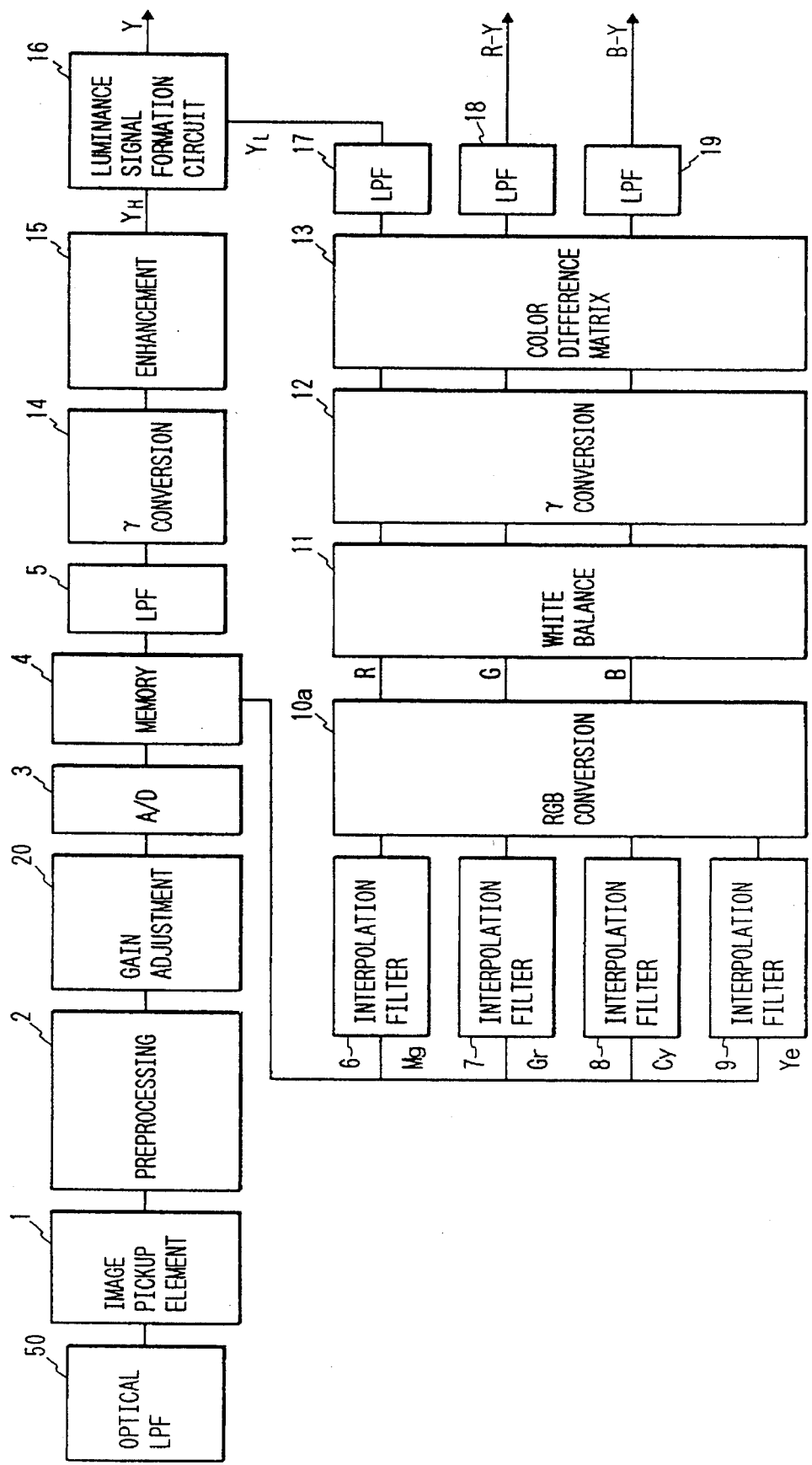
FIG. 15 is a block diagram showing a color image pickup apparatus according to the third embodiment of the present invention.

The same reference numerals in FIG. 15 denote the same constituent elements as in FIG. 4. Since the basic operations of the constituent elements shown in FIG. 15 are the same as those in FIG. 4, a detailed description thereof will be omitted.

This embodiment is characterized in that a gain adjustment circuit 20 is arranged before an A/D converter 3 so that the gains of imaging signals obtained from pixels Mg, Gr, Cy, and Ye are adjusted by the gain adjustment circuit 20 to be uniform with respect to an achromatic object. Note that this gain adjustment may be performed with respect to an analog signal before A/D conversion, as shown in FIG. 15. If, however, the quantization precision of the A/D converter 3 is sufficiently high, gain adjustment may be performed after A/D conversion.

With the aforementioned gain adjustment, superposition of unnecessary modulation components on a luminance signal can be prevented, and a color signal can be improved as follows.

Assume that the matrix A in conversion formula (2) is defined as $$A = (a_{ij})(i=1, 2, 3; j=1, 2, 3, 4) \tag{11}$$

Since the gains of the respective pixels Mg, Gr, Cy and Ye are adjusted by the gain adjustment circuit 20 to be uniform with respect to an achromatic object, the base band components of Mg, Gr, Cy, and Ye can be expressed by using a function $\phi(f_H, f_V)$ as follows:

$$Mg(f_H, f_V) = Gr(f_H, f_V) = Cy(f_H, f_V) = Ye(f_H, f_V) = \phi(f_H, f_V) \tag{12}$$

Providing that the base band components of the respective colors are sufficiently band-limited by two-dimensional filters such as interpolation filters 6, 7, 8, and 9, the carrier components at the position of a frequency $(0, \frac{1}{2}Pv)$ in FIGS. 9 and 10 are defined as follows:

$$Mg(f_H, f_V) = Gr(f_H, f_V) = -\phi(f_H, f_V), \; Cy(f_H, f_V) = Ye(f_H, f_V) = \phi(f_H, f_V),$$

$$Mg(f_H, f_V) = Gr(f_H, f_V) = \phi(f_H, f_V), \; Cy(f_H, f_V) = Ye(f_H, f_V) = -(f_H, f_V) \tag{13}$$

Therefore, the carrier components of the R, G, and B signals at this point can be defined according to equations (2), (11), (12), and (13) as follows:

$$R(f_H, f_V) = \pm(-a_{11} - a_{12} + a_{13} + a_{14})\phi(f_H, f_V),$$

$$G(f_H, f_V) = \pm(-a_{21} - a_{22} + a_{23} + a_{24})\phi(f_H, f_V),$$

$$B(f_H, f_V) = \pm(-a_{31} - a_{32} + a_{33} + a_{34})\phi(f_H, f_V) \tag{14}$$

According to these equations, in each row of the matrix A, if the sum of the coefficients of the first and second columns is equal to the sum of the coefficients of the third and fourth columns, i.e., $$a_{i1} + a_{i2} = a_{i3} + a_{i4} (i=1, 2, 3) \tag{15}$$

then, the carrier components of the R, G, and B signals at the point $(0, \frac{1}{2}Pv)$ are eliminated, and hence no color carriers are generated.

Similarly, if equation (15) is satisfied, carrier components at a point $(0, -\frac{1}{2}Pv)$ symmetrical with the point $(0, \frac{1}{2}Pv)$ with respect to the origin are eliminated, and no color carriers are generated at this point.

By designing the matrix A in an RGB conversion section 10a to satisfy the conditions indicated by equation (15), the carrier components of color signals in the vertical direction can be eliminated. Therefore, color moiré caused by an achromatic object having a fine pattern can be reduced.

Note that if gain adjustment can be accurately performed by the gain adjustment circuit 20 on the basis of the respective color temperature data, white balance adjustment in a white balance section 11 need not be performed.

In this embodiment, the luminance signal Y and the color difference signals R−Y and B−Y may be output according to a non-interlace scheme or an interlace scheme regardless of the presence/absence of the gain adjustment circuit 20. The signals output by the non-interlace scheme are advantageous in image data compression in a card camera and the like and are also suitable as signals to be input to a computer. The signals output by the interlace scheme are suitably used for a video camera and a still video camera. In this case, a D/A converter is required to convert the output signals into analog signals.

The above-described interpolation process, band limiting process, RGB conversion process, and the like are all linear processes. For this reason, even if these processes are performed in different orders, the same result can be obtained. Therefore, the respective processing sections may be arranged in a different order in accordance with hardware used. That is, any circuits which can be made equivalent to that shown in the above-described block diagram by only changing the order to processing circuits are included in the present invention.

As described above, according to the first to third embodiments, color filters are arranged in the image pickup element 1 in the form of an offset sampling array, and the optical low-pass filter 50 is designed to satisfy predetermined conditions. In addition, a matrix operation to be performed when R, G, and B signals are formed from signals output from the image pickup element 1 is performed by using a 3×4 matrix which is designed such that the sum of the coefficients of two arbitrary columns in every row is made equal to the sum of the coefficients of the remaining columns. With this operation, color carriers generated in the horizontal and vertical directions can be reduced, and hence color moiré caused by these color carriers in the horizontal and vertical directions can be reduced. Furthermore, since color moiré caused at the resolution limit can be eliminated, the resolution can be increased to the resolution limit.

Recently, with the introduction of high image-quality formats such as S-VHS and high-band 8 m/m formats, the image quality of color image pickup apparatuses has been rapidly improved. Although the image quality of a camera section must be improved in accordance with this improvement, a single-plate scheme color image pickup apparatus using only one image pickup element has already come close to its limit.

Figure 16:
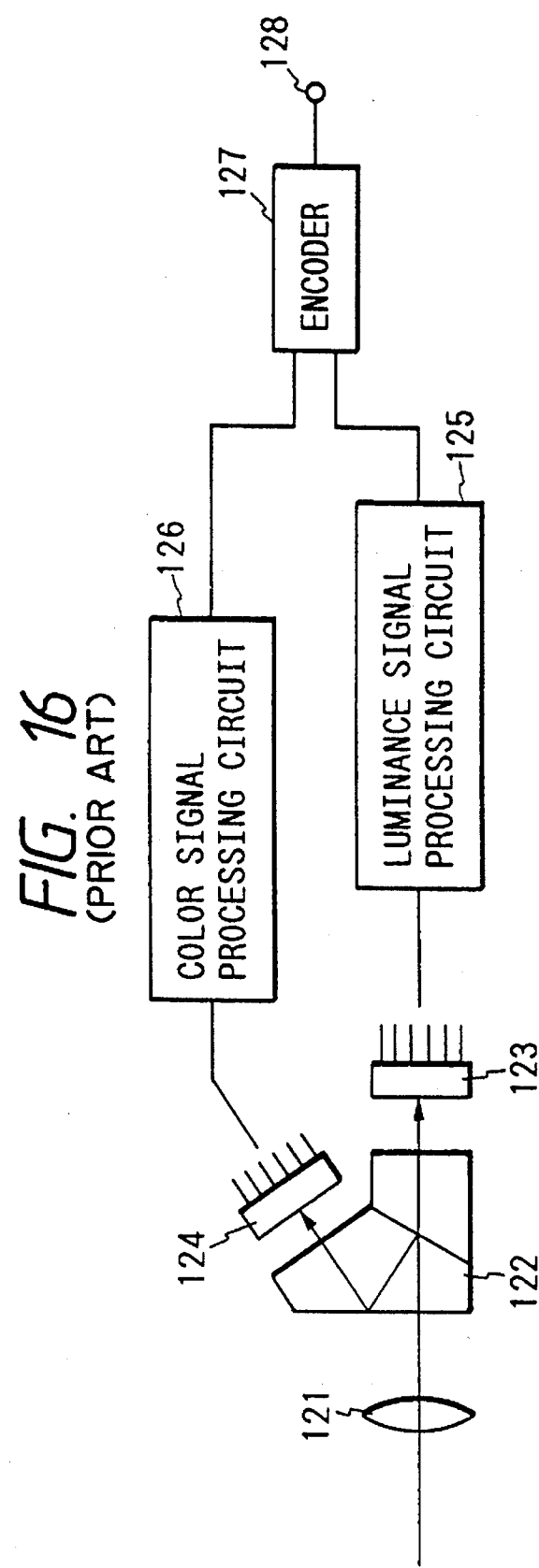
FIG. 16 is a block diagram showing the schematic arrangement of a conventional two-plate scheme color image pickup apparatus.

FIG. 16 shows an arrangement of this two-plate scheme color image pickup apparatus.

Referring to FIG. 16, light incident on a lens 121 is split into two optical paths, and the two light beams are focused on a luminance signal image pickup element 123 and a color signal image pickup element 124.

A signal extracted from the luminance signal image pickup element 123 is subjected to a predetermined process in a luminance signal processing circuit 125 and is input to an encoder 127. A signal extracted from the color signal image pickup element 124 is separated into R, G, and B signals by a color signal processing circuit 126, and the R, G, and B signals are input to the encoder 127. These luminance and color signals are converted into NTSC signals by the encoder 127 and are extracted by an output terminal 128.

Conventionally, for example, image pickup elements having the color filter arrangements shown in FIGS. 17A and 17B have been respectively used as the luminance signal image pickup element 123 and the color signal image pickup element 124. As is apparent from FIGS. 17A and 17B, the luminance signal image pickup element 123 has color filters of green (G) arranged on the entire surface, and the color signal image pickup element 124 has color filters of red (R) and blue (B) arranged in the form of vertical stripes.

In a two-plate scheme color image pickup apparatus, since these two image pickups 123 and 124 are separately arranged, the characteristics of the respective image pickup elements 123 and 124 can be optimized. In addition, a two-plate scheme color image pickup apparatus can acquire data twice as much as a single-plate scheme color image pickup apparatus and hence can obtain high image quality which the single-plate scheme color image pickup apparatus cannot provide.

In this two-plate scheme color image pickup apparatus, however, the optical system is complicated, and two driving circuits are required in correspondence with the two image pickup elements 123 and 124. Therefore, for a color image pickup apparatus which aims at reductions in size, weight, and cost, a conventional two-plate scheme color image pickup apparatus is too large, heavy, and expensive.

Some single-plate scheme color image pickup apparatus can attain image quality as high as that of a two-plate scheme color image pickup apparatus.

As shown in FIG. 18, in this image pickup element, the total number of horizontal lines is set to be twice a desired number of scanning lines, and the horizontal lines for luminance signals, indicated by Y, and the horizontal lines for color signals, indicated by R and B, are alternately arranged. Signals from these two types of lines are read out in pairs, and predetermined signal processing is performed. Note that each color filter indicated by Y is designed in advance such that its spectral characteristics match visual sensitivity.

Even if the above-described two-plate scheme color image pickup apparatus or single-plate scheme color image pickup apparatus is used, the above-described problems of color moiré and insufficient resolution remain unsolved.

Figure 19A:
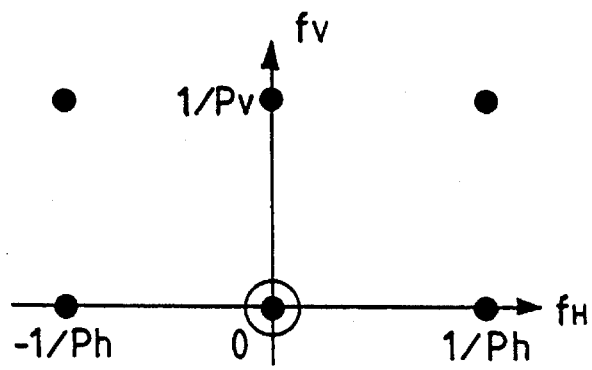
FIGS. 19A and 19B are graphs showing frequency characteristics based on the filter arrangements shown in FIGS. 17A, 17B, and 18.
Figure 19B:
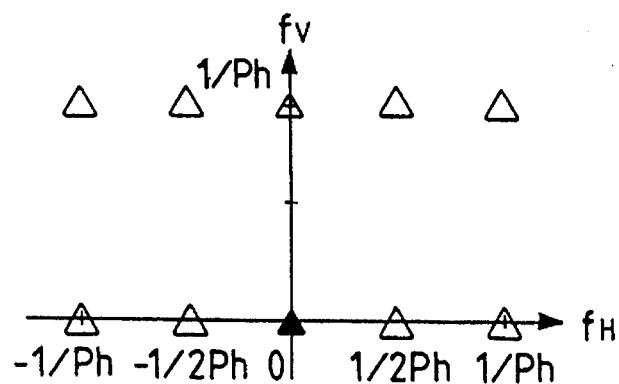

More specifically, both the image pickup elements shown in FIGS. 17A to 18 have the frequency characteristics shown in FIG. 19A and 19B. As is apparent from this graph, color carriers are generated at the positions of frequencies (±½Ph, 0) and (±1/Ph, 0) in the horizontal direction. Therefore, color moiré is caused by the effect of these color carriers. In addition, a frequency component which should be theoretically resolved cannot be resolved.

The fourth to eighth embodiments for solving the above-described problems posed in the case wherein such a single- or two-plate scheme color image pickup apparatus is used will be described below. Note that the fourth and fifth embodiments exemplify the single-plate scheme color image pickup apparatus, and the sixth to eighth embodiments exemplify the two-plate scheme color image pickup apparatus. The same reference numerals in the drawings showing the respective embodiments denote the same parts.

FIG. 20 is a block showing the fourth embodiment.

Referring to FIG. 20, an image pickup element 61 has lines twice as many as a desired number of scanning lines, and has color filters arranged in the manner shown in FIG. 21. In the image pickup element 61, G filters are arranged on odd lines, and R and B filters are alternately arranged on even lines. In this case, of the G filters on the odd lines, the filters on the same columns as those of the R filters are denoted by $G_1$, and the filters on the same columns as those of the B filters are denoted by $G_2$.

Imaging signals output from the image pickup element 61 are separated into $G_1$ and $G_2$ signals and R and B signals by color separation sections 63 and 64, respectively. Note that in this color separation processing, if signals from the odd and even lines shown in FIG. 21 are read out in pairs at once, the processing can be simplified.

The gains of the respectively separated signals are properly adjusted by white balance sections 65 and 66 and are subjected to γ conversion in γ conversion sections 67 and 68. This white balance processing may be performed only with respect to the R and B signals. In this case, white balance gain adjustment is not performed with respect to the $G_1$ and $G_2$ signals.

In an adder 69, the difference between the $G_1$ signal and the R signal output from the γ conversion sections 67 and 68 is calculated to form a difference signal $R-G_1$. In an adder 70, the difference between the $G_2$ signal and the B signal output from the γ conversion sections 67 and 68 is calculated to form a difference signal $B-G_2$.

These difference signals $R-G_1$ and $B-G_2$ are input to a color difference signal processing circuit 72 and are converted into color difference signals R–Y and B–Y according to the following conversion formula. Subsequently, color difference signals R–Y and B–Y having desired frequency bands are generated by a low-pass filter (not shown) and the like.

$$\begin{bmatrix} R-Y \\ B-Y \end{bmatrix} = \begin{bmatrix} 0.70 & -0.11 \\ -0.30 & 0.89 \end{bmatrix} \begin{bmatrix} R-G_1 \\ B-G_2 \end{bmatrix} \qquad (16)$$

Assume that an achromatic object at a position (½Ph, 0) on a spatial frequency plane is imaged by the image pickup element 61. This object has vertical stripes of a period 2Ph. For such an object, $R=G_1$ and $B=G_2$ Therefore, both the difference signals $R-G_1$ and $B-G_2$ output from the adders 69 and 70 become zero.

For this reason, the color difference signals R–Y and B–Y output from the color difference signal processing circuit 72 become zero and hence are not output. This means that the color carrier at the position of the frequency (½Ph, 0) is eliminated. In other words, at the frequency (½Ph, 0), the carrier of the R signal and the carrier of the $G_1$ signal are in phase, and the carrier of the B signal and the carrier of the $G_2$ signal are in phase. Since the carriers of these difference signals $R-G_1$ and $B-G_2$ at this frequency can be eliminated, no color carriers are generated.

The difference signals $R-G_1$ and $B-G_2$ output from the adders 69 and 70 are also input to a luminance correction signal formation circuit 73. The luminance correction signal formation circuit 73 is constituted by a constant multiplier and an adder for the difference signals $R-G_1$ and $B-G_2$. That is, in the luminance correction signal formation circuit 73, a luminance correction signal S is formed from the difference signals $R-G_1$ and $B-G_2$ according to the following conversion formula:

$$S = C_1(R-G_1) + C_2(B-G_2) \qquad (17)$$

where $C_1$ and $C_2$ are constants. For example, $C_1=0.30$ and $C_2=0.11$.

The $G_1$ and $G_2$ signals output from the γ conversion section 67 are input to a luminance signal processing circuit 71 and undergo proper processes, e.g., low-pass filtering and enhancement. The luminance correction signal S formed in the above-described manner is added to the $G_1$ and $G_2$ signals by an adder 74. By adding the luminance correction signal S to the $G_1$ and $G_2$ signals in this manner, the spectral characteristics of the luminance signal are corrected, and a proper luminance signal matching visual sensitivity can be obtained.

As described above, according to this embodiment, since the color carriers at the frequency $f_H$=½Ph can be eliminated, the generation amount of color moiré is small, thereby obtaining a high-resolution color image pickup apparatus.

The fifth embodiment will be described next.

Figure 22:
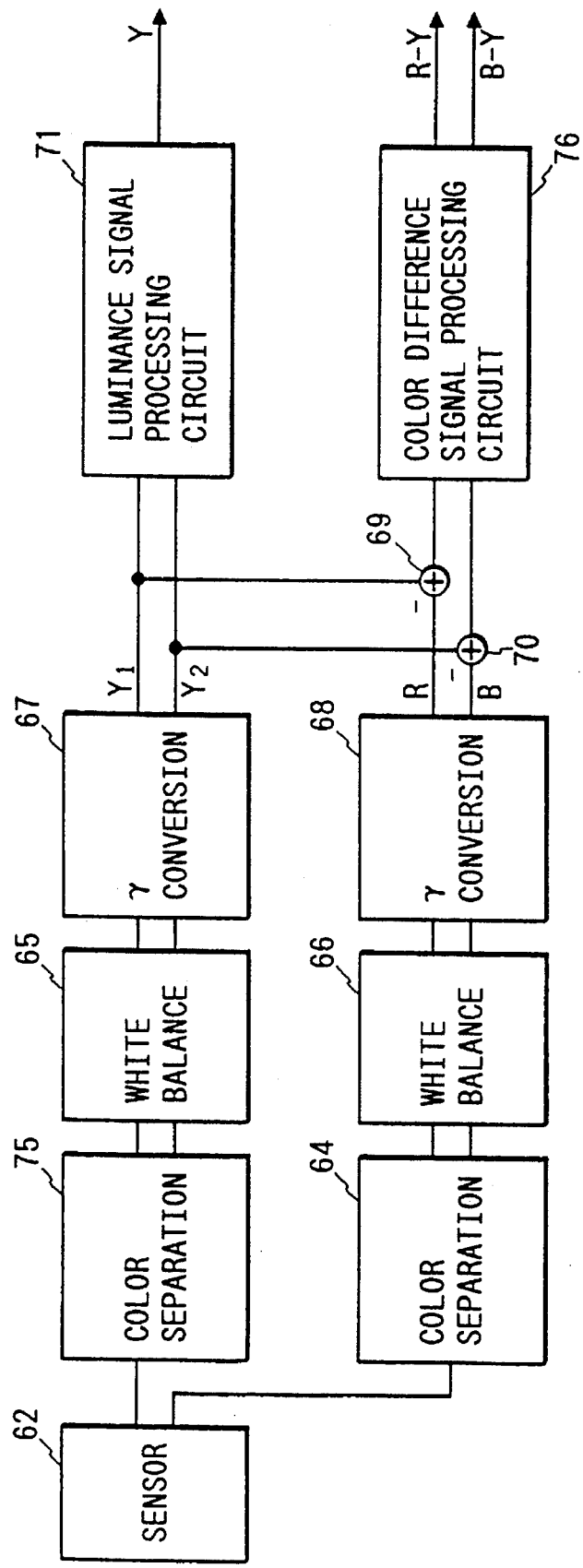
FIG. 22 is a block diagram showing a color image pickup apparatus according to the fifth embodiment of the present invention.

FIG. 22 is a block diagram showing the arrangement of the fifth embodiment.

Referring to FIG. 22, an image pickup element 62 has lines twice as many as a desired number of scanning lines, and has color filters arranged in the manner shown in FIG. 23. In the image pickup element 62, Y filters whose spectral characteristics are designed in advance to match visual sensitivity are arranged on odd lines, and R and B filters are alternately arranged on even lines. In this case, of the Y filters on the odd lines, the filters on the same columns as those of the R filters on the even lines are denoted by $Y_1$, and the filters on the same columns as those of the B filters are denoted by $Y_2$.

In this embodiment, similar to the fourth embodiment described above, difference signals $R-Y_1$ and $B-Y_2$ are formed by adders 69 and 70 on the basis of the $Y_1$ and $Y_2$ signals and the R and B signals separated by color separation sections 75 and 64. The difference signals formed in this case are equivalent to the color difference signal R–Y and B–Y, conversion to color difference signals, indicated by conversion formula (16), need not be performed in a color difference signal processing circuit 76. In addition, since the $Y_1$ and $Y_2$ signals which are adjusted to match visual sensitivity in advance are input to a luminance signal processing circuit 71, the formation of the luminance correction signal S, indicated by conversion formula (17), need not be performed. Therefore, in comparison with the fourth embodiment, the processes in the fifth embodiment can be simplified.

In the fifth embodiment having the above-described arrangement, similar to the fourth embodiment, since the color carriers at the frequency $f_H$=½Ph can be eliminated, the generation amount of color moiré is small. Hence, a high-resolution color image pickup apparatus can be obtained.

The sixth embodiment will be described next.

Figure 24:
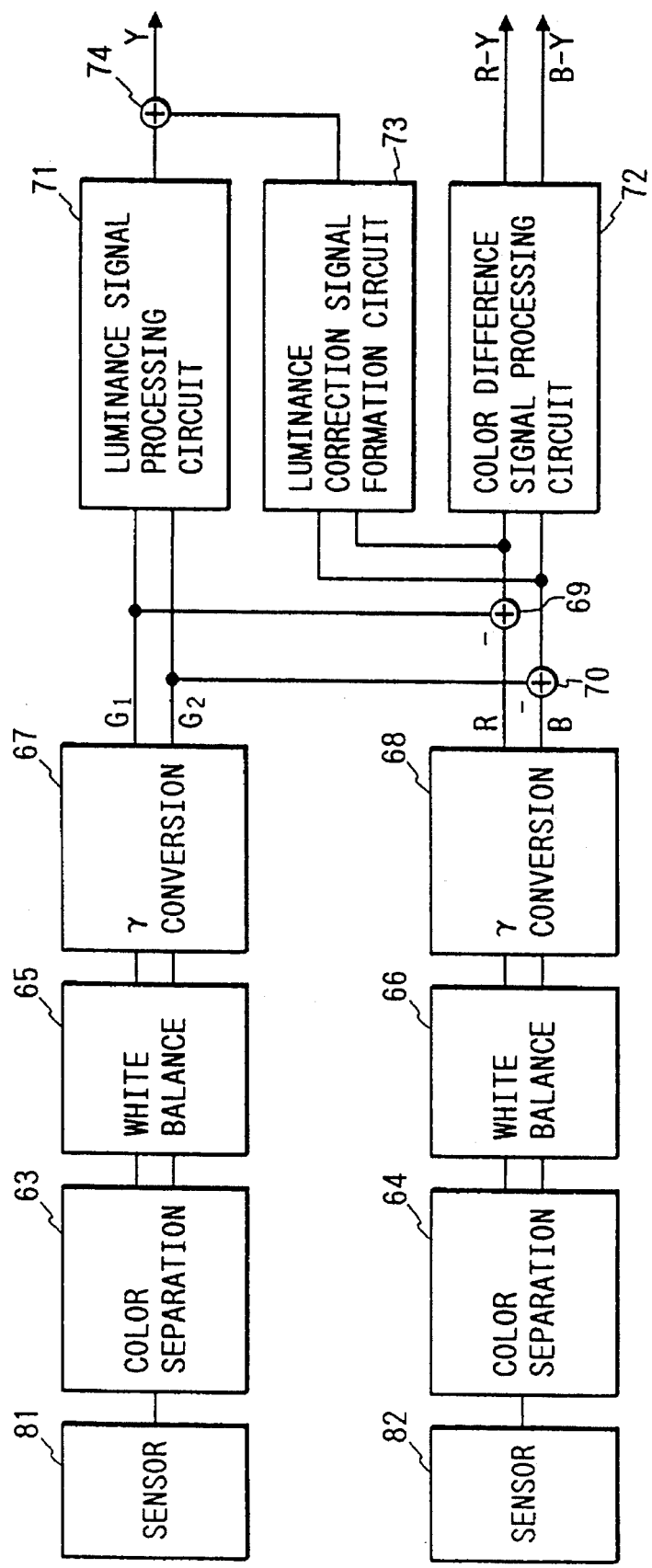
FIG. 24 is a block diagram showing a color image pickup apparatus according to the sixth embodiment of the present invention.

FIG. 24 is a block diagram showing the arrangement of the sixth embodiment.

Referring to FIG. 24, image pickup elements 81 and 82 have color filter arrangements shown in FIGS. 25A and 25B, respectively. More specifically, in the image pickup element 81, the G filters for luminance signals are arranged on the entire surface. In the image pickup element 82, the R and B filters for color signals are alternately arranged in the form of vertical stripes. In this case, of the G filters of the image pickup element 81, the filters at positions equivalent to the positions of the R filters of the image pickup element 82 are denoted by $G_1$, and the filters at positions equivalent to the positions of the B filters are denoted by $G_2$.

This embodiment is characterized by comprising the two image pickup elements 81 and 82, but is the same as the fourth embodiment shown in FIG. 20 in other respects. The operations of the respective portions are the same as those in the fourth embodiment. In this embodiment, therefore, the color carriers at the frequency $f_H$=½Ph can be eliminated, and the generation amount of color moiré is small. Hence, a high-resolution color image pickup apparatus can be obtained.

The seventh embodiment will be described next.

Figure 26:
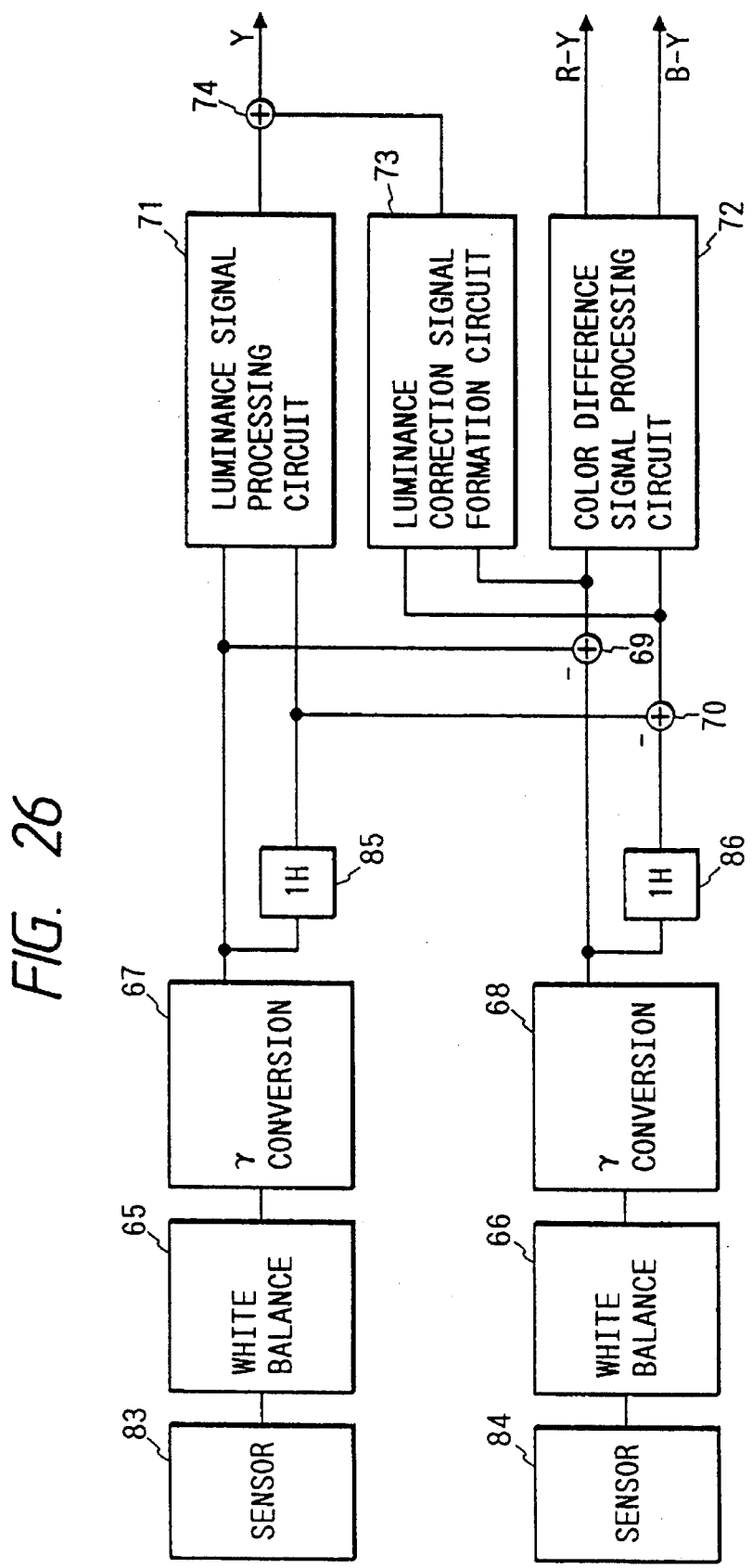
FIG. 26 is a block diagram showing a color image pickup apparatus according to the seventh embodiment of the present invention.

FIG. 26 is a block diagram showing the arrangement of the seventh embodiment.

Referring to FIG. 26, image pickup elements 83 and 84 have the color filter arrangements shown in FIGS. 27A and 27B, respectively. More specifically, in the image pickup element 83, the G filters for luminance signals are arranged on the entire surface. In the image pickup element 84, the R and B filters for color signals are arranged for every two lines in the form of horizontal stripes. In this case, of the G filters of the image pickup element 83, the filters at positions equivalent to the positions of the R filters of the image pickup element 84 on an imaging plane are denoted by $G_1$, and the filters at positions equivalent to the positions of the B filters are denoted by $G_2$.

In the image pickup elements having such filter arrangements, color carriers are generated at the positions indicated in FIGS. 28A and 28B.

In each of the image pickup elements 83 and 84, scanning is performed for every other horizontal line according to an interlace scheme, and the $G_1$ and $G_2$ signals and the R and B signals are respectively read out from the image pickup elements 83 and 84. These signals are subjected to predetermined processes in white balance sections 65 and 66 and γ conversion sections 67 and 68. The resultant signals are then separated into the $G_1$ and $G_2$ signals and the R and B signals by 1H delay circuits 85 and 86, respectively.

Difference signals $R-G_1$ and $B-G_2$ are formed by adders 69 and 70 on the basis of the $G_1$ and R signals and the $G_2$ and B signals separated in this manner. Subsequently, color difference signals R–Y and B–Y are formed by a color difference signal processing circuit 72. In addition, desired band limiting processing is performed by a low-pass filter (not shown) and the like.

Assume that an achromatic object at the position of a frequency (0, ¼Pv) is imaged by the image pickup elements 83 and 84. For such an object, the following equations can be established:

$R=G_1$ and $B=G_2$

Consequently, the difference signals $R-G_1$ and $B-G_2$ become zero. That is, the color difference signals R–Y and B–Y become zero and hence are not output.

This means that the color carriers at the position of the frequency (0, ¼Pv) are eliminated. In other words, at the frequency (0, ¼Pv), the carrier of the R signal and the carrier of the $G_1$ signal are in phase, and the carrier of the B signal and the carrier of the $G_2$ signal are in phase. Therefore, the difference signals $R-G_1$ and $B-G_2$ at this frequency can be eliminated. This prevents the generation of color carriers.

The processes performed by a luminance signal processing circuit 71, a luminance correction signal formation circuit 73, and an adder 74 are the same as those in the fourth embodiment described above. With these processes, the spectral characteristics of a luminance signal are corrected to obtain a proper luminance signal matching visual sensitivity.

Figure 29A:
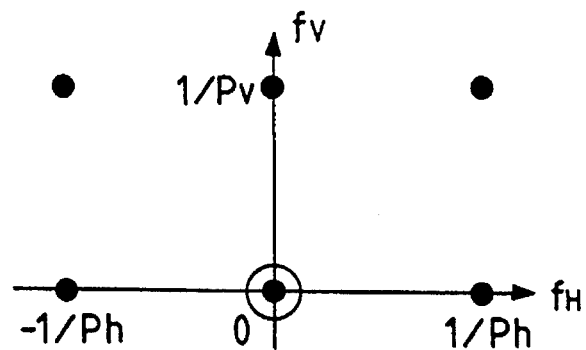
FIGS. 29A and 29B are graphs showing the frequency characteristics of the image pickup elements used for the seventh embodiment.
Figure 29B:
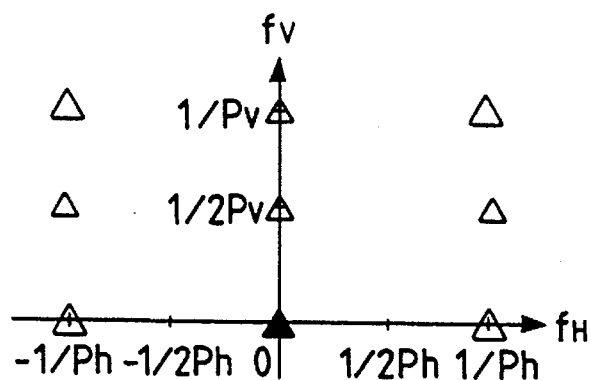

When the image pickup elements 83 and 84 are to be scanned by the non-interlace scheme, the filter arrangement of the image pickup element 84 may be designed such that the R and B filter groups are alternately arranged in the respective lines in the form of horizontal stripes, as shown in FIG. 28B. As shown in FIG. 28A, in this case, the arrangement of the $G_1$ and $G_2$ filters of the image pickup element 83 is also determined in correspondence with the filter arrangement of the image pickup element 84. According to this arrangement, color carriers are generated at the positions indicated by FIGS. 29A and 29B.

In this case, similar to the case wherein signals are read out by the above-described interlace scheme, carriers at the position of a frequency 0, ½Pv) can be eliminated, thus obtaining an excellent image. Furthermore, if a memory capable of storing signals corresponding to one frame is used, an interlaced image can be also obtained.

Figure 31A:
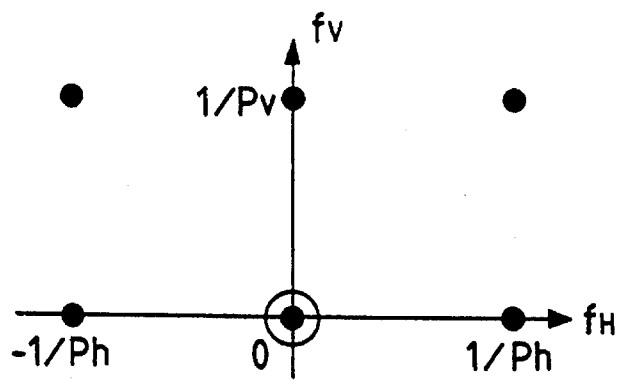
FIGS. 31A and 31B are graphs showing the frequency characteristics of the image pickup elements used for the seventh embodiment.
Figure 31B:
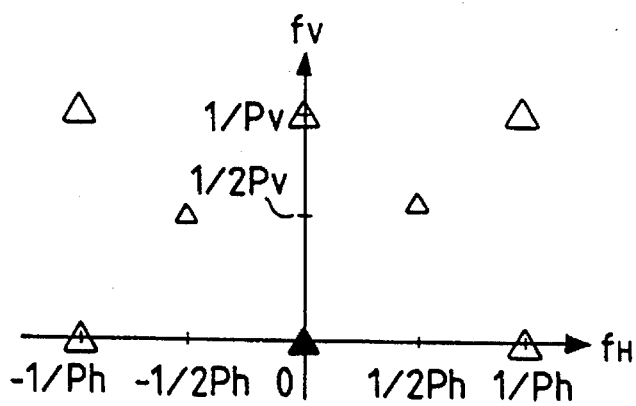

The image pickup elements 83 and 84 may have the filter arrangements shown in FIGS. 30A and 30B, respectively. In this case, in the image pickup element 84, the R and B filters are arranged in an offset manner, as shown in FIG. 30B. In accordance with this arrangement, the $G_1$ and $G_2$ filters of the image pickup element 83 are also arranged in an offset manner, as shown in FIG. 30A. According to these arrangements, color carriers are generated at the positions indicated by FIGS. 31A and 31B.

In this case, by performing the same processing as that described above, the color carriers at the positions of frequencies (±½Ph, ½Pv) can be eliminated to obtain an image having high quality.

In this embodiment, the difference signals $R-G_1$ and $B-G_2$ are switched at a one-horizontal signal period (1H). Therefore, in order to obtain desired color difference signals and luminance correction signal S by the conversion processing in the color difference signal processing circuit 72, indicated by equation (16), and the formation processing of the luminance correction signal S in the luminance correction signal formation circuit 73, indicated by equation (17), for example, input signals to the respective circuits must be switched at a period of 1H.

The eighth embodiment will be described next.

FIG. 32 is a block diagram showing the arrangement of the eighth embodiment.

Referring to FIG. 32, image pickup elements 87 and 88 have the color filter arrangements shown in FIGS. 33A and 33B, respectively. More specifically, in the image pickup element 87, the Y filters for luminance signals are arranged on the entire surface. In the image pickup element 88, the R and B filters for color signals are alternately arranged in the form of vertical stripes. In this case, of the G filters of the image pickup element 87, the filters at positions equivalent to those of the R filter groups of the image pickup element 88 on the imaging plane are denoted by $Y_1$, and the filters at positions equivalent to those of the B filter groups are denoted by $Y_2$. As described above, this embodiment is characterized by comprising the two image pickup elements 87 and 88, but is the same as the fifth embodiment shown in FIG. 22 in other respects. The operations of the respective components are the same as those in the fifth embodiment. That is, in the eighth embodiment, the color carriers at the frequency $f_H=$ ½Ph can be eliminated. Therefore, there is provided a high-resolution color image pickup apparatus in which the generation amount of color moiré is small. In addition, in the eighth embodiment, the luminance signal formation processing can be simplified as compared with the sixth and seventh embodiments.

In the eighth embodiment, the color filter arrangement shown in FIG. 33B is used for the image pickup element 88. However, the present invention is not limited to this, and any one of the color filter arrangements shown in FIGS. 27B, 28B, and 30B may be used. In this case, separation processing of the $Y_1$ and $Y_2$ in the image pickup element 87 may be performed in the same manner as the separation processing of the $G_1$ and $G_2$ signals in FIGS. 27A, 28A, and 30A, respectively.

In the fourth to eighth embodiments described above, an excellent image having a small amount of color moiré and high resolution can be obtained both in a motion picture image pickup apparatus such as a video camera and in a still picture image pickup apparatus such as an electronic still camera.

As described above, according to the embodiments of the present invention, a color filter array arranged in an image pickup element has an offset sampling structure in which color filters of difference colors are repeatedly arranged at a two-pixel period in the horizontal direction, and color filters of different colors are repeatedly arranged at a two-pixel period in the vertical direction while being offset by one pixel in the horizontal direction. With this arrangement, color carriers generated in the horizontal and vertical directions can be reduced, and color moiré caused by these color carriers in the horizontal and vertical direction can be reduced. Furthermore, since color moiré caused at the resolution limit can be eliminated, the resolution can be increased to the resolution limit.

In addition, an optical low-pass filter is constituted by an optical member for splitting an incident light beam into two light beams separated from each other by the distance D, which satisfies the predetermined conditions, in a direction inclined clockwise or counterclockwise at the angle Θ with respect to the scanning direction of the image pickup element. Therefore, satisfactory MTF characteristics can be obtain in a region lower than the resolution limit, and the resolution can be increased to the resolution limit. Furthermore, color moiré caused by aliasing distortion of color carriers generated at frequencies higher than that of the resolution limit can be reduced.

That is, an optical low-pass filter need not be designed in consideration of the trade-off between resolution and color moiré but can be designed with priority being given to resolution. Therefore, a high-resolution still frame image can be obtained.

The gain of an output from an image pickup element is adjusted such that outputs from four types of color filters are made constant. In addition, a matrix operation to be performed when the R, G, and B signals are formed from these outputs is performed by using a 3×4 matrix designed such that the sum of the coefficients of two arbitrary columns of every row is made equal to the sum of the coefficients of the remaining two columns. For this reason, the color carriers generated in the vertical direction can be further reduced, and color moiré in the vertical direction can be further reduced, thereby obtaining an excellent image.

If the color image pickup apparatus of the present invention is a multiple-plate scheme color image pickup apparatus using a plurality of image pickup elements or a single-plate scheme color image pickup apparatus using an image pickup element having horizontal lines twice as many as those of a general image pickup element, first to third color filters of different colors are arranged for the respective pixels. With this arrangement, two types of difference signals are formed on the basis of signals obtained from given pixels for which the second and third color filters are respectively arranged, and signals obtained from pixels which are at positions equivalent to those of the given pixels on the imaging plane and for which the first color filters are arranged. Color difference signals are obtained on the basis of these difference signals. Therefore, the color carriers generated in the horizontal and vertical directions can be reduced, thus reducing color moiré and obtaining a high-resolution image.

In addition, since a luminance signal is formed by performing proper correction with respect to a signal obtained from each pixel for which the first color filter is arranged, using these difference signals, an image having a high S/N ratio can be obtained. As the first color filter, a luminance signal color filter which is designed in advance in consideration of the aforementioned correction is used, and a luminance signal is formed on the basis of a signal obtained from this color filter. Therefore, an image having high quality can be obtained, and moreover, the luminance signal formation processing can be simplified.

Since these processes are performed digitally, there are merits in terms of the uniformity and stability of performance.

Another embodiment of the present invention will be described next.

Figure 35:
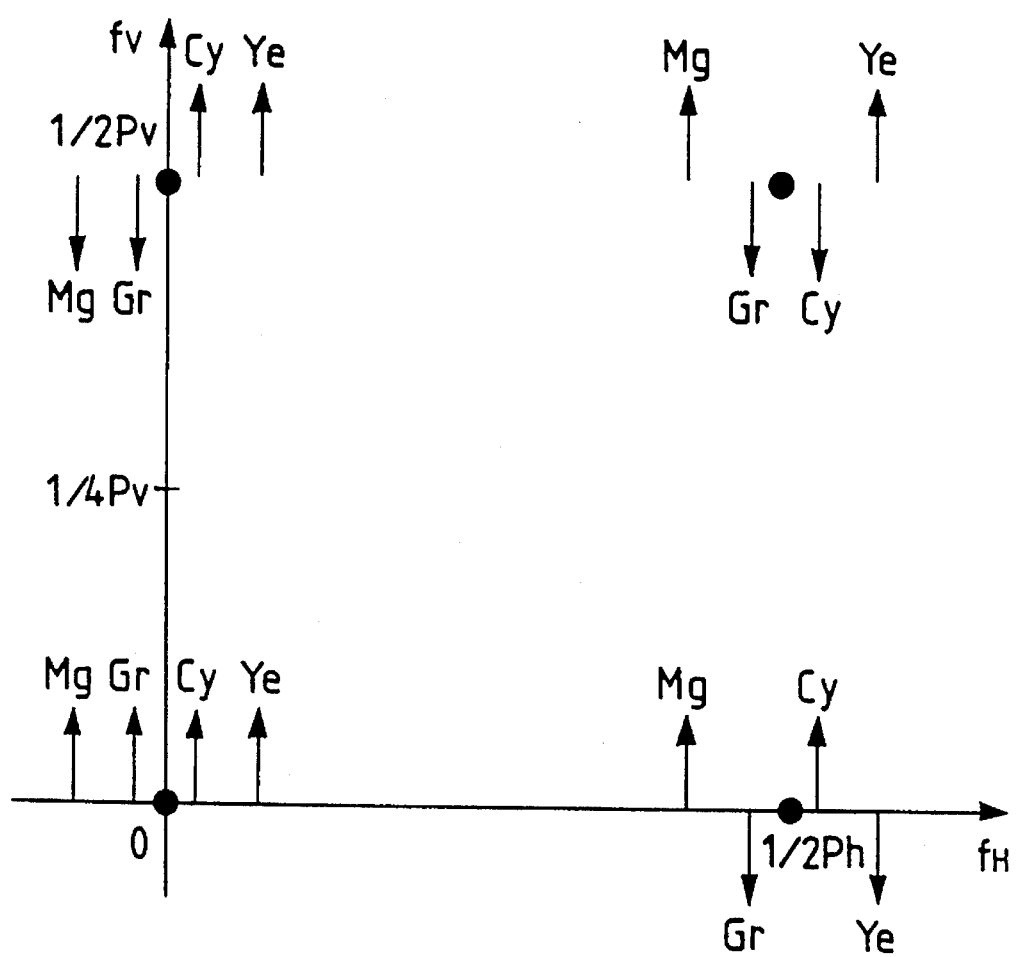
FIG. 35 is a graph showing the characteristics of the sampling structure of the image pickup element shown in FIG. 34 in a frequency space.

FIG. 34 shows the color filter arrangement of an image pickup element according to this embodiment. This color filter array is constituted by the Mg, G, Cy, and Ye filters, which are arranged at periods 2Ph and 2Pv in the horizontal and vertical directions, respectively, thus forming a square sampling structure. The color filter array need not be designed to be exactly the same as that shown in FIG. 34. For example, the lines of Mg and G and the lines of Cy and Ye may be interchanged, and the columns of Mg, Cy, G, . . . and the columns of G, Ye, Mg, . . . may be interchanged. FIG. 35 shows the spatial frequency characteristics of this image pickup element. Referring to FIG. 35, the arrows indicate carriers of the respective colors, and their directions indicate phase relationships. As is apparent from this graph, no color carriers are generated at a frequency (0, ¼Pv) in the vertical direction. Although color carriers are generated at a frequency (½Ph, 0) in the horizontal direction, since an independent read operation is performed, the color carriers can be reduced by gain adjustment and by using a primary color separation matrix. These color carriers can also be reduced by a low-pass filter.

Figure 36:
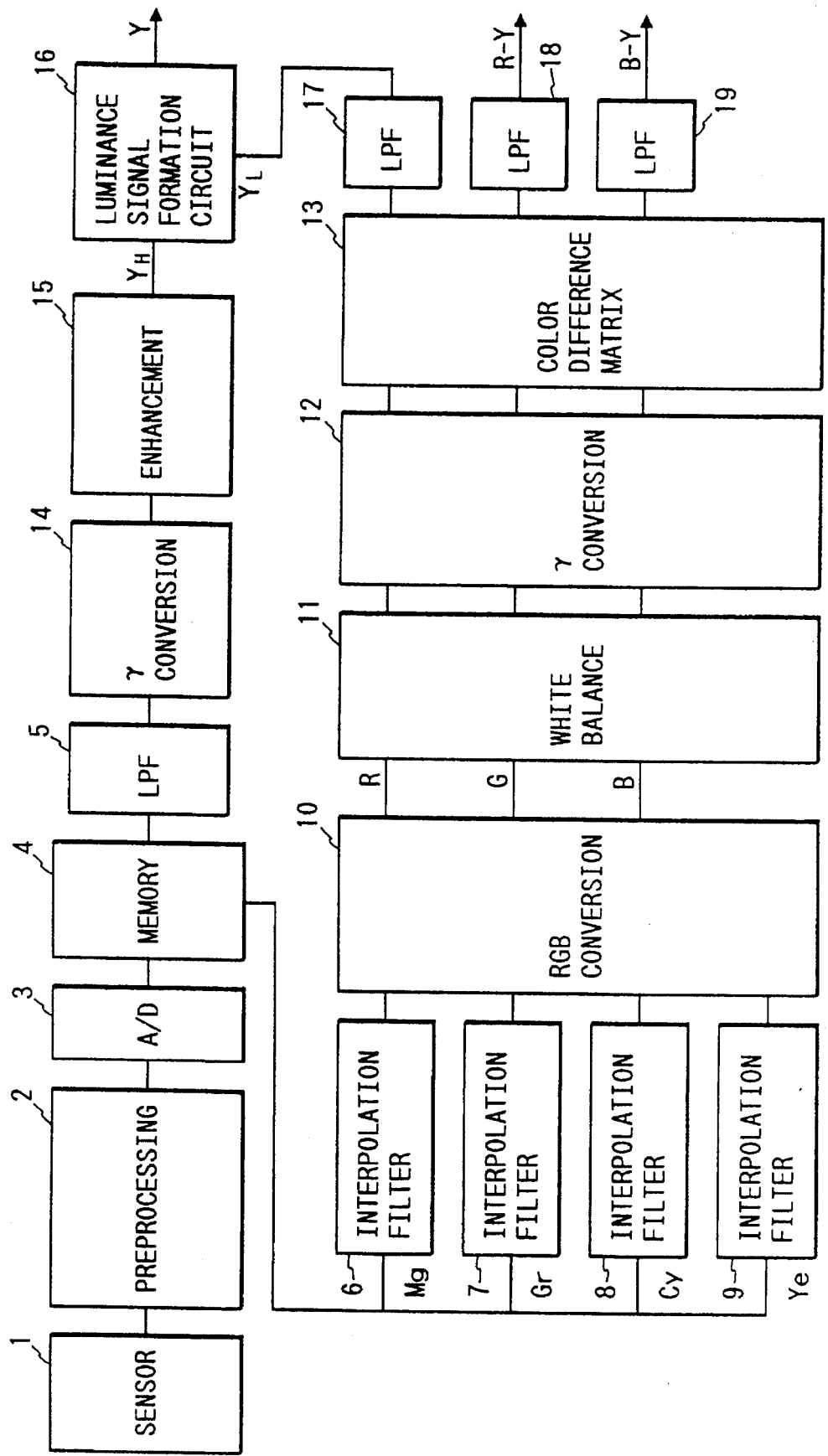
FIG. 36 is a block diagram showing an embodiment of the present invention.

An arrangement of a color image pickup apparatus of the embodiment will be described next. FIG. 36 is a block diagram showing the embodiment. An image pickup element having the four types of color filters shown in FIG. 34 and arranged on an element surface is arranged in a sensor 1. Image signals are read out from the sensor 1 in units of pixels. The image signals read out from the sensor 1 in units of pixels are subjected to processes such as CDS and AGC processes in a preprocessing circuit 2. Thereafter, the signals are A/D-converted by an A/D converter 3 at a timing synchronized with a read clock. The A/D converter 3 preferably has linear characteristics in consideration of subsequent color processing, and preferably has the ability to perform A/D conversion with a precision of 8 bits or more in consideration of quantization errors.

The A/D-converted signals are temporarily written in a buffer memory 4 and are read out therefrom for two-dimensional signal processing to be performed later.

Luminance signals are read out from a buffer memory 4 in the order corresponding to the pixel array of the image pickup element. The readout signals are subjected to a predetermined band limiting process in a low-pass filter 5. The resultant signals are converted into a luminance signal $Y_H$ containing a high-frequency component through a $\gamma$ conversion section 14 and an enhancer 15. The luminance signal $Y_H$ is then synthesized with a luminance low-frequency component $Y_L$, obtained by a method to be described later, by a luminance signal formation circuit 16. The resultant signal is output as a luminance signal Y.

Meanwhile, signals corresponding to color signals Mg, Gr, Cy, and Ye are read out from the buffer memory 4 and are input to four interpolation filters 6, 7, 8, and 9 to be converted into synchronized color signals Mg, Gr, Cy, and Ye. Subsequently, these color signals are input to an RGB conversion section 10 to be converted into three primary color signals R, G, and B.

In a white balance section 11, the R, G, and B signals are converted into signals $\alpha$R, G, and $\beta$B, thus achieving a white balance.

In a $\gamma$ conversion section 12, $\gamma$ conversion of the R, G, and B signals is performed by table conversion.

In a color difference matrix section 13, conversion conforming to the NTSC standards is performed to generate the aforementioned low-frequency component $Y_L$ and two color difference signals R–Y and B–Y. The color difference signals R–Y and B–Y are subjected to a predetermined band limiting process in low-pass filters 18 and 19, respectively. The resultant signals are then output.

The low-frequency component $Y_L$ is subjected to a predetermined band limiting process in a low-pass filter 17. The low-frequency component is then synthesized with the luminance signal $Y_H$ containing the high-frequency component by the luminance signal formation circuit 16, as described above, and the resultant signal is output as the luminance signal Y. This processing is performed by the following conversion formula:

$$Y = Y_H - \delta(LPF17)*Y_H + \delta Y_L \quad (0 \leq \delta \leq 1) \qquad (4)$$

where (LPF17) indicates a low-pass filter having the same band as that of the low-pass filter 17, and (LPF17)* $Y_H$ indicates that the same band limiting process as that performed by the low-pass filter 17 is performed with respect to the luminance signal $Y_H$. Such conversion is performed for the following reasons. In general, the low-frequency component $Y_L$ represents proper luminance in terms of spectral characteristics but is not sufficiently high in S/N ratio. In contrast to this, the luminance signal $Y$ is sufficiently high in S/N ratio but does not necessarily represent proper luminance in terms of spectral characteristics. If the S/N ratio of the low-frequency component $Y_L$ is sufficiently high, the δ value may be fixed to "1". In this case, the processing is equivalent to replacing a portion, of the luminance signal $Y_H$, having the same band as that of the low-frequency component $Y_L$ with the low-frequency component $Y_L$. If the spectral characteristics of the luminance signal $Y_H$ are sufficiently close to the proper luminance characteristics, the δ value may be fixed to "0". In this case, no processing is performed by the luminance signal formation circuit 16, and the luminance signal $Y_H$ is directly output as the luminance signal Y. In addition, the δ value may be adaptively changed in accordance with the brightness and color information of an object to be photographed, considering S/N ratio and color reproduction characteristics.

Figure 37:
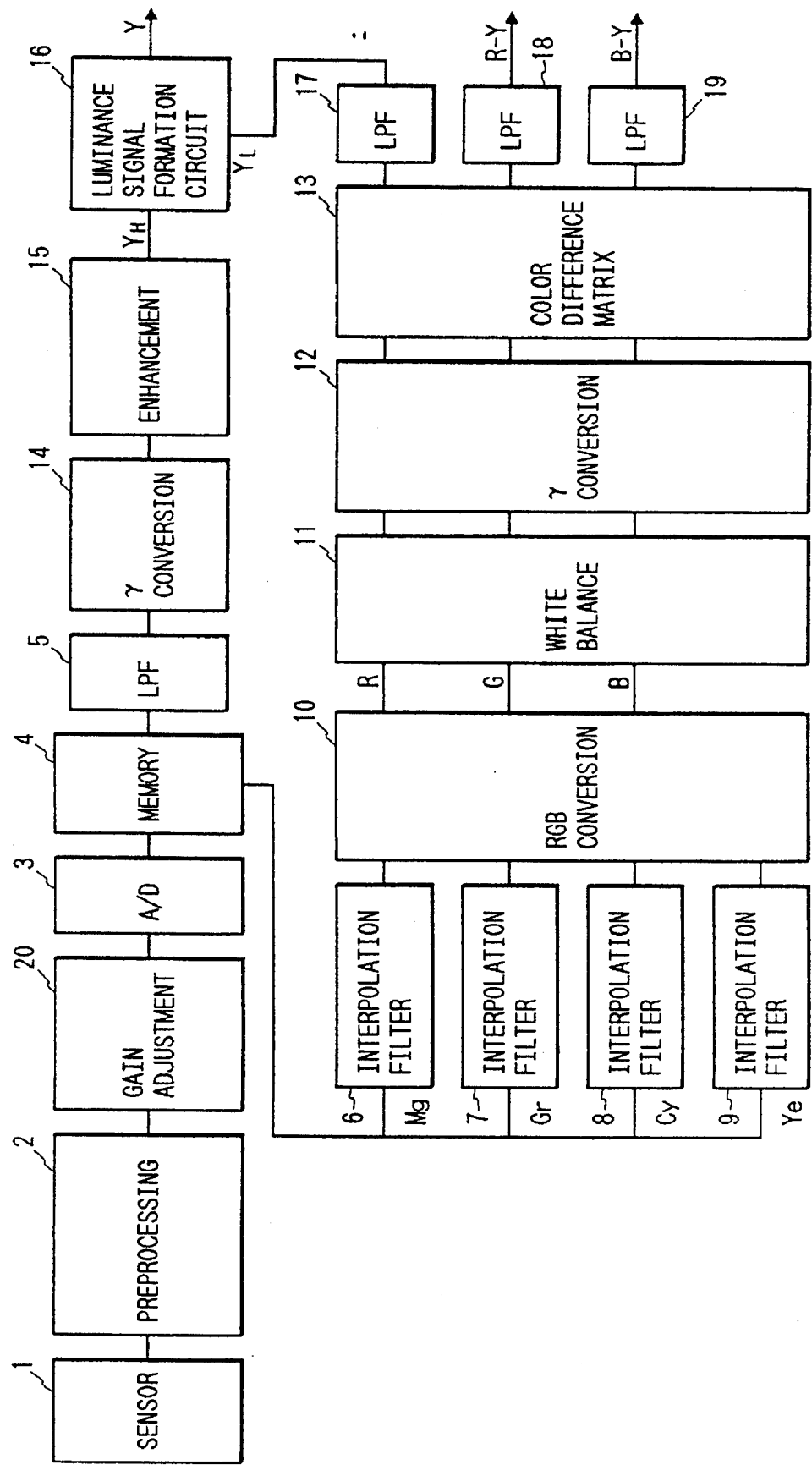
FIG. 37 is a block diagram showing another embodiment of the present invention.

FIG. 37 shows still another embodiment of the present invention. In this arrangement, the gains of pixels Mg, Gr, Cy, and Ye are adjusted by a gain adjustment circuit 20 to be uniform with respect to an achromatic object. This gain adjustment may be performed with respect to an analog signal before A/D conversion, as shown in FIG. 37. If, however, the quantization precision of an A/D converter 3 is sufficiently high, gain adjustment may be performed after A/D conversion. With this processing, superposition of unnecessary modulation components on a luminance signal can be prevented, and a color signal can be improved as follows.

Assume that in conversion formula (2) used by the RGB conversion section 10, $$A=(a_{ij})(i=1, 2, 3; j=1, 2, 3, 4) \quad (11)$$

Since the gains of the respective pixels Mg, Gr, Cy and Ye are adjusted by the gain adjustment circuit 20 to be uniform with respect to an achromatic object, the base band components of Mg, Gr, Cy, and Ye can be expressed by using a function $\phi(f_H, f_V)$ as follows:

$$Mg(f_H, f_V)=Gr(f_H, f_V)=Cy(f_H, f_V)=Ye(f_H, f_V)=\phi(f_H, f_V) \quad (12)$$

Providing that the base band components of the respective colors are sufficiently band-limited, the carrier components at the position of a frequency $(0, \tfrac{1}{2}Pv)$ are defined as follows:

$$Mg(f_H, f_V)=Gr(f_H, f_V)=-\phi(f_H, f_V),\ Cy(f_H, f_V)=Ye(f, f_V)=\phi(f_H, f_V) \quad (18)$$

Therefore, the carrier components of the R, G, and B signals at this point can be defined according to equations (2), (11), (12), and (18) as follows:

$$R(f_H, f_V)=(-a_{11}-a_{12}+a_{13}+a_{14})\phi(f_H, f_V),$$

$$G(f_H, f_V)=(-a_{21}-a_{22}+a_{23}+a_{24})\phi(f_H, f_V),$$

$$B(f_H, f_V)=(-a_{31}-a_{32}+a_{33}+a_{34})\phi(f_H, f_V) \quad (19)$$

In this case, in each row of the matrix A, if the sum of the coefficients of the first and second columns is equal to the sum of the coefficients of the third and fourth columns, i.e., $$a_{i1}+a_{i2}=a_{i3}+a_{i4}(i=1, 2, 3) \quad (15)$$

then, the carrier components of the R, G, and B signals at the point $0, \tfrac{1}{2}Pv$ are eliminated, and hence no color carriers are generated. That is, when conversion formula (2) used by the RGB conversion section 10 satisfies the conditions indicated by equation (15), the carrier components of color signals in the vertical direction can be eliminated. Therefore, color moiré caused by an achromatic object having a fine pattern can be reduced.

In the horizontal direction, the carrier components at the position $(\tfrac{1}{2}Pv, 0)$ in FIG. 35 are defined as:

$$Mg(f_H, f_V)=Cy(f_H, f_V)=-\phi(f_H, f_V),\ G(f_H, f_V)=Ye(f_H, f_V)=\phi(f_H, f_V) \quad (20)$$

Therefore, the carrier components of the R, G, and B signals at this point are represented according to equations (2), (11), (12), and (20) as follows:

$$R(f_H, f_V)=(-a_{11}+a_{12}-a_{13}+a_{14})\phi(f_H, f_V),$$

$$G(f_H, f_V)=(-a_{21}+a_{22}-a_{23}+a_{24})\phi(f_H, f_V),$$

$$B(f_H, f_V)=(-a_{31}+a_{32}-a_{33}+a_{34})\phi(f_H, f_V) \quad (21)$$

In this case, in each row of the matrix A, if the sum of the coefficients of the first and third columns is equal to the sum of the coefficients of the second and fourth columns, the carrier components of the R, G, and B signals at the point $(\tfrac{1}{2}Ph, 0)$ are eliminated, and hence no color carriers are generated at this point. By satisfying these conditions, the carrier components of color signals in the horizontal direction can be eliminated. Therefore, color moiré caused by an achromatic object having a fine pattern can be reduced. When priority is to be given to the vertical resolution, the matrix A is defined according to equations (19). When priority is to be given to the horizontal resolution, a matrix is designed according to equations (21). Since no color moiré in oblique directions is caused at $(\tfrac{1}{4}Ph, \tfrac{1}{4}Pv)$, the color moiré in the horizontal and vertical directions can be conveniently eliminated by optimally switching or adjusting matrixes. By adaptively performing this adjustment in accordance with an image to be picked up, an excellent image having high resolution can be obtained.

Note that if gain adjustment can be accurately performed by the gain adjustment circuit 20 in accordance with the respective color temperatures, no adjustment is required in the white balance section 11.

In each of the above-described embodiments of the present invention, the luminance signal Y and the color difference signals R–Y and B–Y may be output by a non-interlace scheme or an interlace scheme. The signals output by the non-interlace scheme are advantageous in image data compression in a card camera and are also suitable as signals to be input to a computer. The signals output by the interlace scheme can be used for a video camera or a still video camera. In this case, a D/A converter for converting the output signals into analog signals is required at the output terminal.

Figure 38:
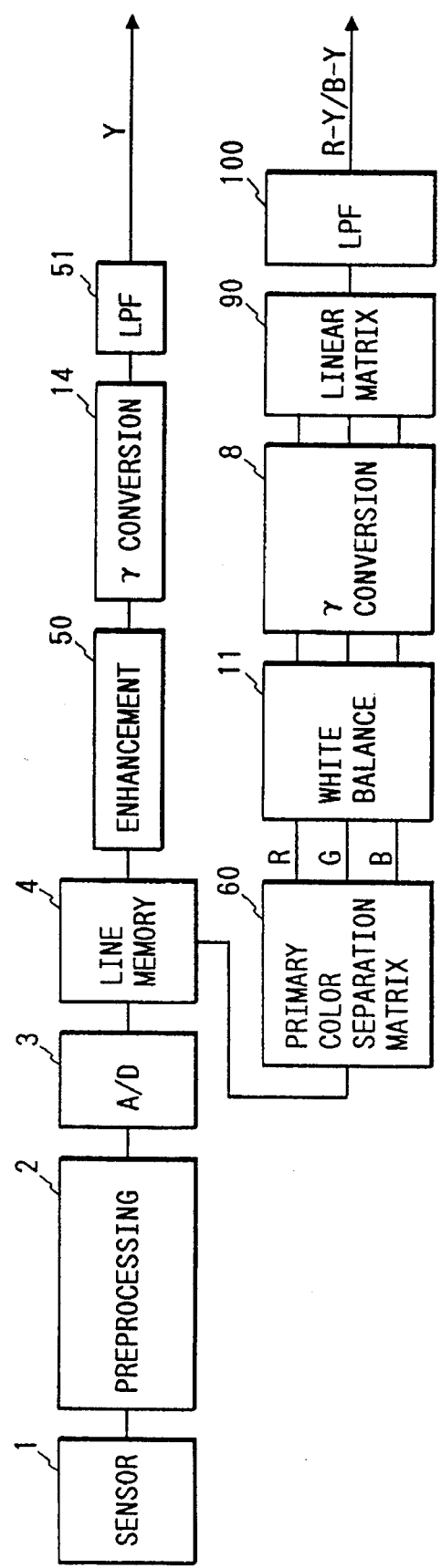
FIG. 38 is a block diagram showing still another embodiment of the present invention.

FIG. 38 shows still another embodiment of the present invention.

The four types of color filters shown in FIG. 6 are arranged in a sensor 1. Signals simultaneously read out from the sensor 1, two pixels at a time, are added together. The resultant signal is read out as an image signal. A read operation is performed according to the non-interlace scheme as follows. First, signals from two lines are added to obtain signals from one line. The read line is shifted downward by one line, and signals from two pixels, i.e., upper and lower pixels, are added together. Image signals read out from the sensor 1 are subjected to processes such as CDS and AGC processes in a preprocessing circuit 2. The resultant signals are A/D-converted by an A/D converter 3 at a timing synchronized with a read clock.

Figure 39:
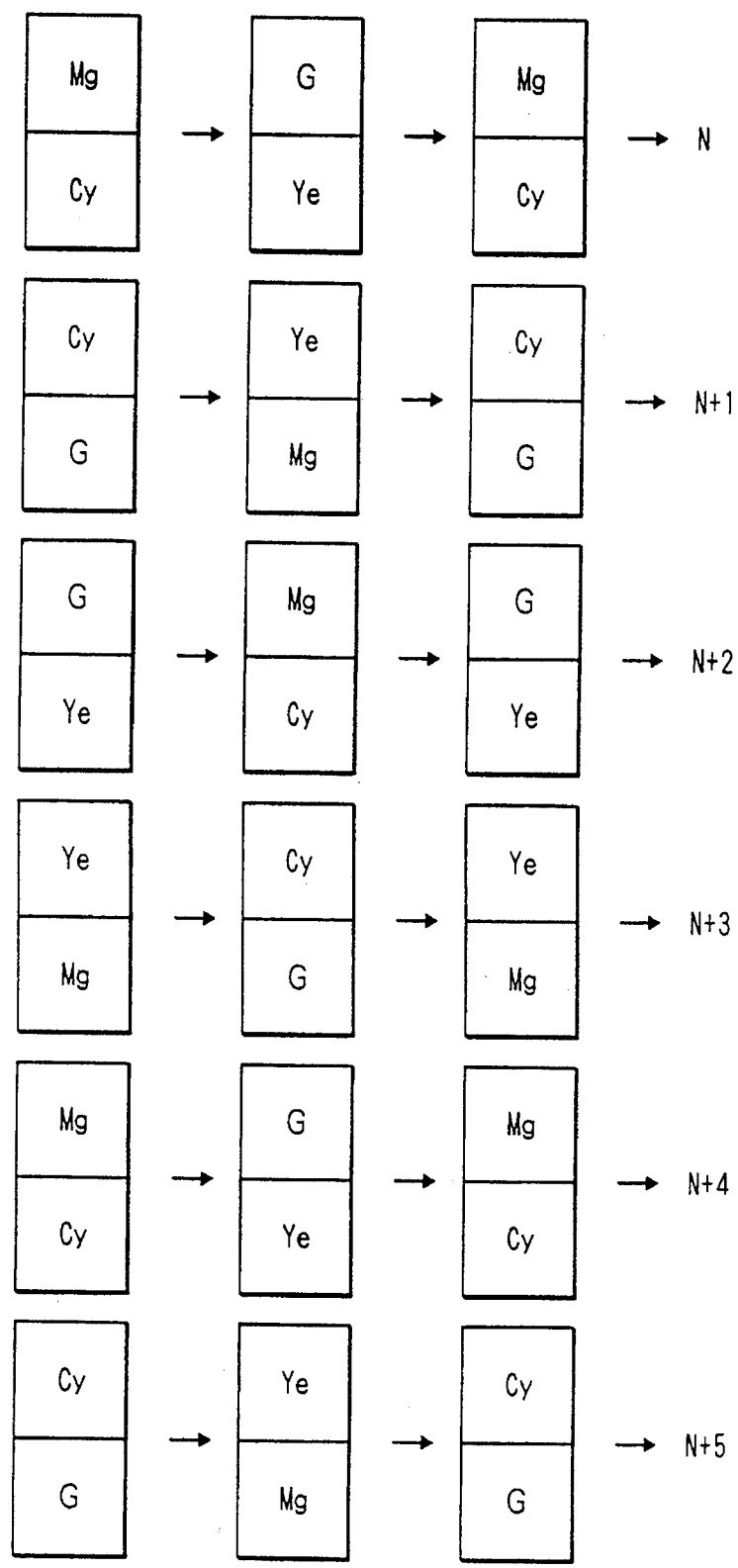
FIG. 39 is a chart showing a method of reading out signals from the color filter array of an image pickup element.

The A/D-converted image signals are stored in four or more lines in a line memory 4. A write/read operation with respect to the line memory 4 is performed as follows. Signals from two pixels are simultaneously read out while the read line is shifted line by line, as shown in FIG. 39, and the readout signals are treated as a signal from one pixel. Signals from one line are formed in this manner, and signals from four lines are recorded. The signals from the first line are extracted from the line memory 4, and the extracted signals and the signals from the current line ((N+4)th line) are averaged to form pixels. When the read line is an odd line, signals corresponding to the read line and signals from a line immediately preceding the read line are simultaneously read out. If the read line is an even line, signals from the read line and a line three lines ahead of the read line are simultaneously read out.

A luminance signal is read in different manners depending on whether the read line is an even line or an odd line. When the read line is an odd line, the sum of signals from a line three lines ahead of the read line is calculated along the time base. When the read line is an even line, the sum of signals corresponding to a line immediately preceding the read line is calculated along the time base. For example, letting Yn be the luminance signal to be read out, Yn=Cy+G+Ye+Mg= 2R+3G+2B for an odd line, and Yn =Mg+Cy+G+Ye=2R+ 3G+2B for an even line. That is, Yn=2R+3G+2B regardless of whether the read line is an even line or an odd line. This luminance signal Yn has a value very close to the spectral characteristics defined by the NTSC standards, and hence is directly used as a luminance signal Y. This luminance signal is band-limited by a low-pass filter 51 to be output as the luminance signal Y through an enhancer 50 and a γ conversion section 14.

Figures 40, 49:
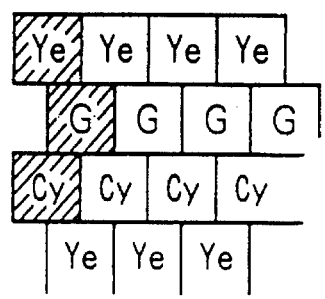
FIG. 40 is a chart showing a method of inputting image signals read out in FIG. 39 to a primary color separation matrix.
FIG. 49 is a chart for explaining a method of forming luminance signals.

Color difference signals 2R–G and 2B–G are formed on the basis of signals from two lines, extracted in the manner shown in FIG. 40, by using a primary color separation matrix 60 according to S1–S2 and S2–S1 where S1 is the target pixel and S2 is the pixel shifted along the time base by one pixel, thereby performing primary color separation. For example, for an even line, S2–S1=(Ye+Mg)–(Cy+G)= 2R–G, and S1–S2=(Mg+Cy)–(G+Ye)=2B–G. In addition, since Yn–(S1+S2)=5G, the R, G, and B signals are extracted from this. The R, G, and B signals, which have undergone primary color separation, are converted into signals αR, G, and βB by a white balance section 11, thus achieving a white balance.

These signals are then subjected to γ conversion in a γ conversion section 12.

In a linear matrix section 90, conversion conforming to the NTSC standards is performed according to equation (4) to extract color difference signals R–Y and B–Y. The signals are subjected to a predetermined band limiting process in a low-pass filter 100. The resultant signals are then output.

Figure 41:
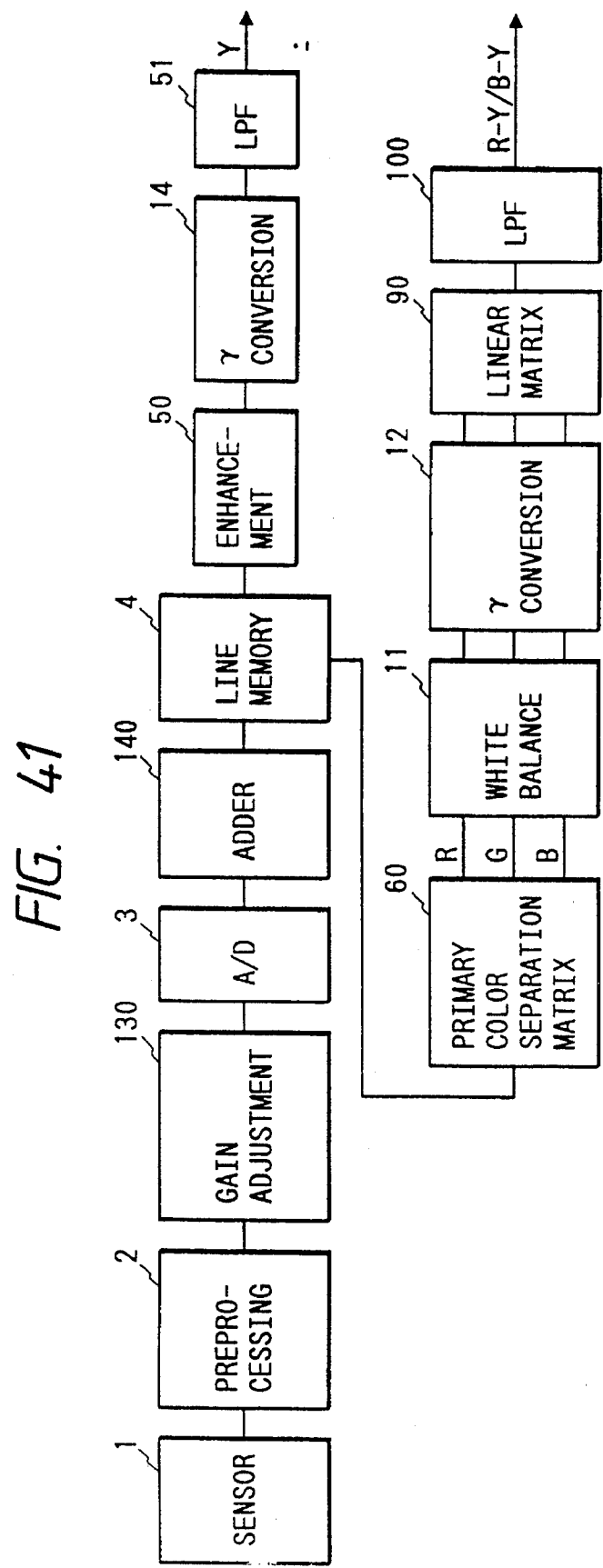
FIG. 41 is a block diagram showing still another embodiment of the present invention.

FIG. 41 shows still another embodiment of the present invention. In this embodiment, the gains of signals independently read from Mg, G, Cy, and Ye pixels are adjusted by a gain adjustment circuit 130 to be uniform with respect to an achromatic object to be photographed, and signals from two pixels are added by an adder 140 and are stored in a line memory 4. Since signals from two pixels are independently read and added by the adder 140 and are stored in the line memory 4, the gains of signals from the respective pixels can be made uniform, thereby suppressing color moiré. The gain adjustment circuit 130 may be arranged before an A/D converter 3, as shown in FIG. 41. If the quantization precision of A/D conversion is sufficiently high, the gain adjustment circuit 130 may be arranged behind the A/D converter 3.

According to each embodiment described above, there is provided a color image pickup apparatus which can reduce color moiré in the horizontal and vertical directions, has high resolution, and can form a still frame image. In addition, an optical low-pass filter need not be designed in consideration of the trade-off between resolution and color moiré but can be designed with priority being given to resolution. For this reason, the optical low-pass filter can be made low in profile and compact. Therefore, the overall image pickup apparatus can be made compact.

Since all the processes are performed as digital processes, there are merits in terms of the uniformity and stability of performance.

Still another embodiment will be described next.

This embodiment is designed to provide an image pickup apparatus having higher resolution. This apparatus includes an image pickup element having a plurality of pixels arranged in the form of a matrix, with color filters of the same color being arranged for the respective pixels in the horizontal direction, and color filters of three or more different colors being alternately arranged for the respective pixels in the vertical direction.

In still another embodiment, an image pickup apparatus includes an image pickup element having a plurality of pixels offset in the horizontal direction for every other lines, with color filters of the same color being arranged for the respective pixels in the horizontal direction, and color filters of three or more different colors being alternately arranged for the respective pixels in the vertical direction.

According to the embodiment described above, the color filters are arranged in the form of horizontal stripes. With this arrangement, since a luminance signal is formed by adding signals from three pixels in the vertical direction, high resolution can be attained.

In addition, the color filters are arranged in the form of horizontal stripes in a solid-state sensor having an offset arrangement. With this arrangement, since a luminance signal is formed by using signals from three pixels in the vertical direction, high resolution can be attained.

Each embodiment will be described below with reference to the accompanying drawings.

Figures 42, 43:
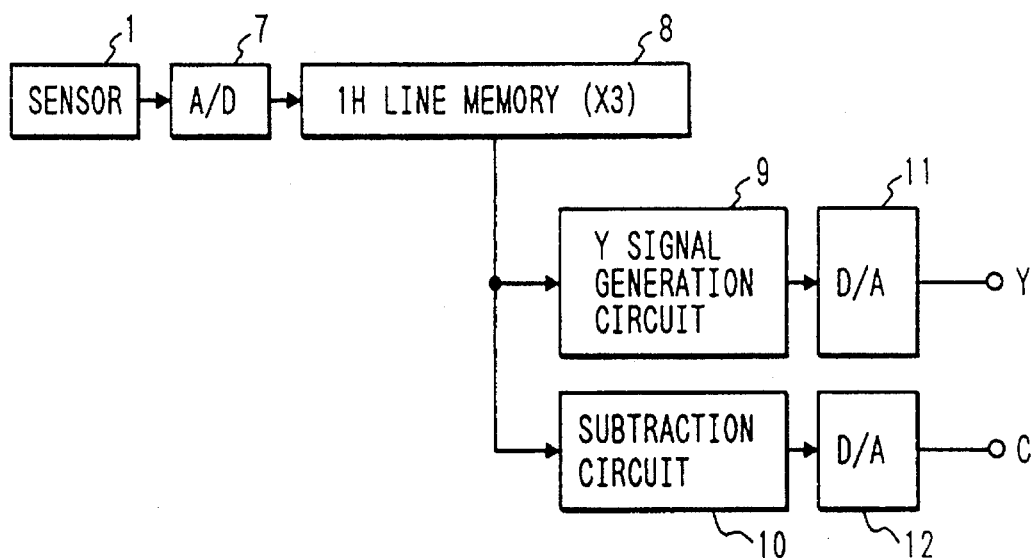
FIG. 42 is a chart showing a color filter pattern according to the above embodiments.
FIG. 43 is a block diagram showing an image pickup apparatus according to the embodiment.

As shown in FIG. 42, three color filters, i.e., yellow (Ye), green (G), and cyan (Cy) filters, are repeatedly arranged, on a solid-state sensor, in the horizontal direction in the form of horizontal stripes.

Referring to FIG. 43, signals output from the sensor 1 are input to an A/D converter 7 to be converted into digital signals. Signals from one horizontal line are stored in a line memory circuit 8 using three 1H line memories. Signals from a total of three lines, i.e., the first, second, and third lines, are sequentially stored in the line memory circuit 8. Since three colors are repeatedly arranged, signals are always stored, as combinations of Ye, G, and Cy, in the memory corresponding to three horizontal lines. On the basis of the digital data corresponding to three horizontal lines, a luminance signal is generated by a Y signal generation circuit 9, and a color signal is generated by a subtraction circuit 10. The generated signals are respectively output, as an analog luminance signal Y and an analog color signal C, through D/A converters 11 and 12.

Figure 44:
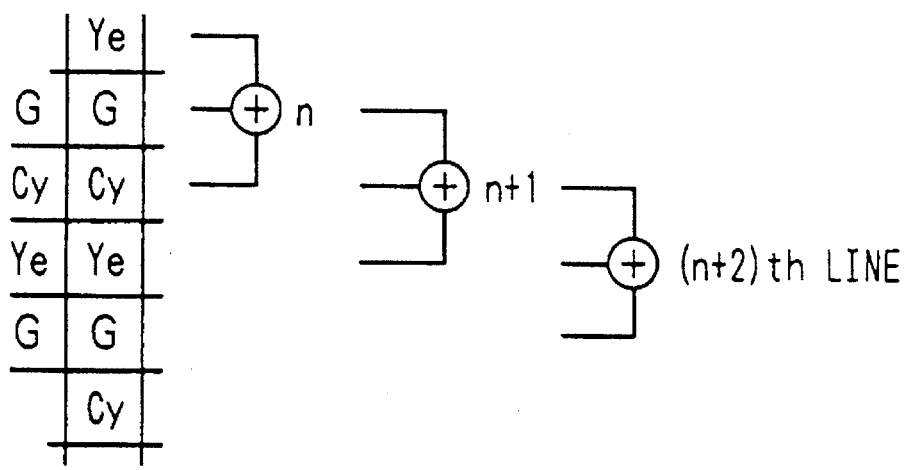
FIG. 44 is a chart for explaining a method of forming luminance signals.

A method of generating the luminance signal Y will be described next with reference to FIG. 44. A luminance signal $Y_n$ corresponding the nth line is obtained by adding the following signals in the vertical direction:

Ye corresponding to the (n–1)th line

G corresponding to the nth line

Cy corresponding to the (n+1)th line

That is, $Y_n = Ye + G + Cy$

Similarly, a luminance signal $Y_{n+1}$ corresponding to the (n+1)th line is generated as follows:

$Y_{n+1} = G + Cy + Ye$

The scheme of this embodiment is characterized in that no line step is caused because the component ratio of the respective color signals, i.e., Cy+G+Ye, of the luminance signal Y generated from each line is constant.

Figure 45:
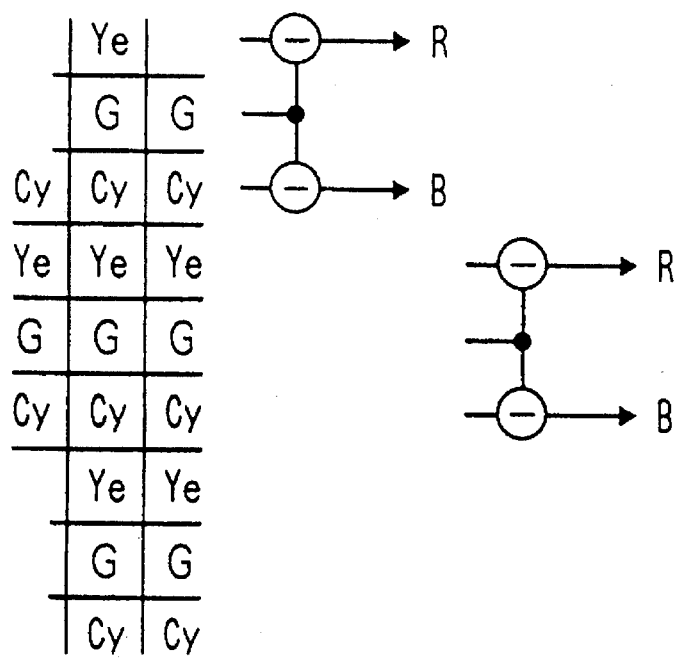
FIG. 45 is a chart for explaining a method of forming color signals.

A method of generating color signals will be described next with reference to FIG. 45. The R signal is obtained by subtracting G, which is located closest to Ye, from Ye. That is, $R = Ye - G$ Similarly, $B = Cy - G$ Although both the R and B signals cannot be obtained with respect to all the horizontal lines, synchronization may be performed by using a line memory or the like.

In the above-described embodiment, the Cy, G, and Ye filters are combined. It is, however, apparent that other color filters may be combined.

Still another embodiment will be described next with reference to the accompanying drawings.

Figure 46:
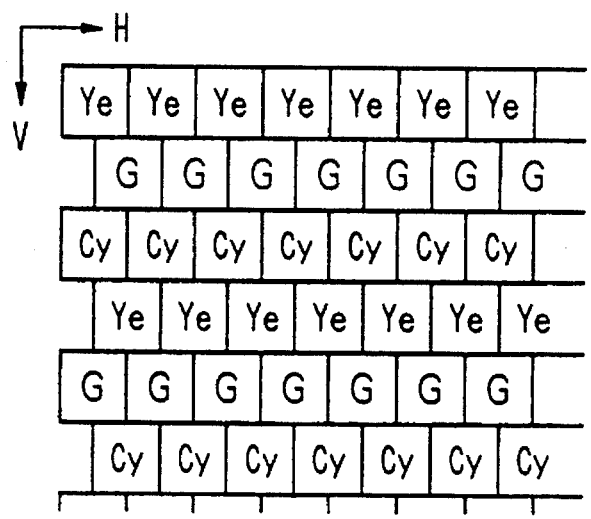
FIG. 46 is a chart showing a color filter pattern according to still another embodiment of the present invention.

As shown in FIG. 46, three color filters, i.e., the Ye, G, and Cy filters, are repeatedly arranged on a solid-state sensor in the horizontal direction. Although the color filters in FIG. 46 are arranged in the same order as that of the color filters in FIG. 42, the positions of the respective pixels in FIG. 46 are shifted in the horizontal direction for every other lines.

Figure 47:
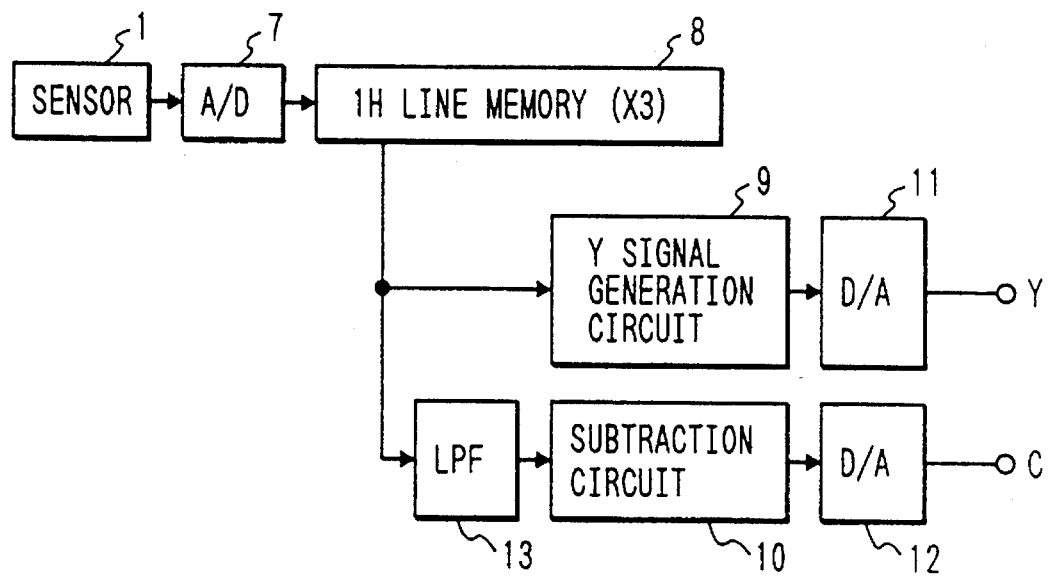
FIG. 47 is a block diagram showing an image pickup apparatus according to the above embodiment.

Referring to FIG. 47, signals output from a sensor 1 are converted into digital signals by an A/D converter 7, and signals corresponding to one horizontal line are stored in a line memory of a line memory circuit 8. Signals from a total of three lines, i.e., the first, second, and third lines, are sequentially stored in the line memory circuit 8. Since three colors are repeatedly arranged, signals are always stored, as combinations of Ye, G, and Cy, in the memory corresponding to three horizontal lines. On the basis of the digital data corresponding to three horizontal lines, a luminance signal is generated by a Y signal generation circuit 9, and a color signal C is generated through a low-pass filter (LPF) 13 (to be described later) and a subtraction circuit 10. The generated signals are respectively output, as an analog luminance signal Y and an analog color signal C, through D/A converters 11 and 12.

A method of generating luminance signals will be described next with reference to FIG. 48. For example, a horizontal luminance signal $Y_{2n}$ of the second line is represented as follows:

$Y_{2n} = Y_{21}, Y_{22}, Y_{23}, Y_{24}, Y_{25}, \ldots = \{(Ye_{11}+Ye_{12}+2G_{11}+Cy_{11}+Cy_{12})/6\}, \{(2Ye_{12}+G_{11}+G_{12}+2Cy_{12})/6\}, \{(Ye_{12}+Ye_{13}+2G_{12}+Cy_{12}+Cy_{13})/6\},$ Similarly, a horizontal luminance signal $Y_{3n}$ of the third line is represented as follows:

$Y_{3n} = Y_{31}, Y_{32}, Y_{33}, Y_{34}, \ldots = \{(2G_{11}+Cy_{11}+Cy_{12}+2Ye_{21})/6\}, \{(G_{11}+G_{12}+2Cy_{12}+Ye_{21}+Ye_{22})/6\}, \{(2G_{12}+Cy_{12}+Cy_{13}+2Ye_{22})/6\},$ As described above, at any lines, luminance signals are generated with a constant ratio, i.e., $Y = Ye + G + Cy$ Therefore, no line step is caused. A method of generating color signals will be described next.

First, band limiting is performed by the LPF 13 with respect to the following Ye signal string of the first line:

$Ye_{1n} = Ye_{11}, Ye_{12}, Ye_{13}, Ye_{14}, Ye_{15},$

Similarly, band limiting is performed by the LPF 13 with respect to the G signal string of the second line and the Cy signal string of the third line:

$G_{1n} = G_{11}, G_{12}, G_{13}, G_{14},$ $Cy_{1n} = Cy_{11}, Cy_{12}, Cy_{13}, Cy_{14},$

By performing subtraction processing, in the vertical direction, with respect to low-frequency color signal strings $Ye_{L1n}$, $G_{L1n}$, and $Cy_{L1n}$ obtained in this manner, a red signal ($R_L$) and a blue signal ($B_L$) are obtained.

This subtraction processing is performed according to the following equations:

$R_{L1n} = Ye_{L1n} - G_{L1n}$ $B_{L1n} = Cy_{L1n} - G_{L1n}$

Although both the R and B signals cannot be obtained with respect to all the horizontal lines, synchronization may be performed by using a line memory or the like.

In the above-described embodiment, a calculation method equivalent to interpolation is used to generate a luminance signal. However, as shown in FIG. 49, a luminance signal may be generated by adding signals from three pixels Ye, G, and Cy. In this case, the luminance signal is represented as follows:

$Y_{2n} = Y_{21}, Y_{22}, Y_{23}, Y_{24}, \ldots = \{(Ye_{11}+G_{11}+Cy_{11})/3\}, \{(Ye_{12}+G_{11}+Cy_{12})/3\}, \{(Ye_{12}+G_{12}+Cy_{12})/3\},$ As described above, the above-described embodiment includes an image pickup element having a plurality of pixels arranged in the form of a matrix, with color filters of the same color being arranged for the respective pixels in the horizontal direction, and filters of three or more different colors being alternately arranged for the respective pixels in the vertical direction, thereby providing an image pickup apparatus which can attain high horizontal resolution with a simple arrangement. If, for example, a sensor having 780 pixels in the horizontal direction according to the NTSC scheme is used, a horizontal resolution of about 780× 0.8≈600 can be expected. In addition, since no inconveniences such as line steps are caused, uniform, high image quality can be obtained.

According to still another embodiment, an image pickup apparatus includes an image pickup element having a plurality of pixels offset in the horizontal direction for every other lines, with color filters of the same color being arranged for the respective pixels in the horizontal direction, and color filters of three or more different colors being alternately arranged for the respective pixels in the vertical direction. With this image pickup element, high horizontal resolution can be obtained, which is a characteristic feature of an offset arrangement of pixels, and uniform image quality free from line steps can be realized with a simple arrangement.

What is claimed is:

1. A color image pickup apparatus comprising:

an image pickup element having four types of color filters which are arranged to form an offset sampling structure in which color filters of different colors are repeatedly arranged at a two-pixel period in a horizontal direction, and color filters of different colors are repeatedly arranged at a two-pixel period in a vertical direction while being offset in the horizontal direction by one pixel;

an optical low-pass filter having an optical member for splitting an incident light beam into two light beams separated from each other by a distance D in a direction inclined clockwise or counterclockwise at an angle θ with respect to a scanning direction of said image pickup element, the distance D satisfying conditions defined by $$1.6 P_h P_v / |P_h \sin\theta + 2P_v \cos\theta| \leq D \leq 2.4 P_h P_v / |P_h \sin\theta + 2P_v \cos\theta| \quad (0 \leq \theta \leq \pi/2)$$

where Ph is a pitch of said image pickup element in the horizontal direction, and Pv is a pitch of said image pickup element in the vertical direction, where the two light beams are output by said optical low-pass filter to said image pickup element which filters the two light beams into color information, and where the color information is digital signal processed to obtain an image;

gain adjustment means for adjusting a gain of output color information output from said image pickup element so as to make outputs from said four types of color filters constant with respect to an achromatic object; and signal formation means for forming R, G, and B signals from the gain adjusted output color information by converting gain adjusted outputs from said four types of color filters of said image pickup element by performing a matrix operation using a 3×4 matrix designed such that a sum of coefficients of two arbitrary columns in every row is equal to a sum of coefficients of two remaining columns.

2. A color image pickup apparatus comprising:

an image pickup element having four types of color filters which are arranged to form an offset sampling structure in which color filters of different colors are repeatedly arranged at a two-pixel period in a horizontal direction, and color filters of different colors are repeatedly arranged at a two-pixel period in a vertical direction while being offset in the horizontal direction by one pixel; and signal formation means for forming R, G, and B signals from the outputs from said four types of color filters by performing a matrix operation using a 3×4 matrix designed such that a sum of coefficients of two arbitrary columns in every row is equal to a sum of coefficients of remaining two columns.

* * * * *

UNITED STATES PATENT AND TRADEMARK OFFICE
CERTIFICATE OF CORRECTION

PATENT NO. : 5,541,648

DATED : July 30, 1996

INVENTOR(S) : Udagawa et al.

It is certified that error appears in the above-identified patent and that said Letters Patent is hereby corrected as shown below:

COLUMN 1:

Line 56, "element has" should read --elements have--;
Line 65, "$An_{n-1}$," should read --$A_{n-1}$,--; and
Line 66, $Bn_{n-1}$," should read --$B_{n-1}$,--.

COLUMN 2:

Line 1, "(Ye and Gr)," should read --(Ye + Gr),--.

COLUMN 10:

Line 33, "$1 \leq d_1 \leq 2.4 PhPv/1$" should read --$1 \leq d_1 \leq 2.4 PhPv/1$--.

COLUMN 12:
 Line 12,
"=-$(f_H, f_V)$" should read --=-$\phi(f_H, f_V)$--.

COLUMN 14:
 Line 32,
"block" should read --block diagram--.

UNITED STATES PATENT AND TRADEMARK OFFICE
CERTIFICATE OF CORRECTION

PATENT NO. : 5,541,648

DATED : July 30, 1996

INVENTOR(S) : Udagawa et al.

Page 2 of 3

It is certified that error appears in the above-identified patent and that said Letters Patent is hereby corrected as shown below:

COLUMN 20:

Line 26, "Y." should read --$Y_H$--.

COLUMN 21:

Line 3, "Y." should read --$Y_H$--.

COLUMN 22:

Line 31, "moir" should read --moiré--; and
Line 32, "é" should be deleted.

COLUMN 24:

Line 24, "lines," should read --line,--; and
Line 62, "corresponding" should read --corresponding to--.

COLUMN 25:

Line 54, "$Cy_{13})/6)$," should read --$Cy_{13})/6)$, ...--;
Line 60, "$\{(2G_{12}+Cy_{12}+Cy_{13}+2Ye_{22})/6\}$," should read
    --$\{(2G_{12}+Cy_{12}+Cy_{13}+2Ye_{22})/6\}$, ...--; and
Line 62, "lines," should read --line,--.

UNITED STATES PATENT AND TRADEMARK OFFICE
CERTIFICATE OF CORRECTION

PATENT NO. : 5,541,648

DATED : July 30, 1996

INVENTOR(S) : Udagawa et al.

It is certified that error appears in the above-identified patent and that said Letters Patent is hereby corrected as shown below:

COLUMN 26:

Line 4, "$Ye_{15}$," should read --$Ye_{15}$, ...--;
Line 9, "$G_{14}$," should read --$G_{14}$, ...--;
Line 11, "$Cy_{14}$," should read --$Cy_{14}$, ...--;
Line 33, "$\{(Ye_{12}+G_{12}+Cy_{12})/3\}$," should read
     --$\{(Ye_{12}+G_{12}+Cy_{12})/3\}$, ...--; and
Line 52, "lines," should read --line,--.

Signed and Sealed this

Fourth Day of November, 1997

Attest:

*Attesting Officer*

BRUCE LEHMAN

*Commissioner of Patents and Trademarks*